US012700668B2

(12) United States Patent
West et al.

(10) Patent No.: US 12,700,668 B2
(45) Date of Patent: Aug. 4, 2026

(54) DOUBLY CONFORMAL CARD-BASED AESA ARCHITECTURE

(71) Applicant: Rockwell Collins, Inc., Cedar Rapids, IA (US)

(72) Inventors: James B. West, Cedar Rapids, IA (US); Jeremiah D. Wolf, Atkins, IA (US); Jiwon L. Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 275 days.

(21) Appl. No.: 18/414,143

(22) Filed: Jan. 16, 2024

(65) Prior Publication Data

US 2025/0343352 A1 Nov. 6, 2025

(51) Int. Cl.
*H01Q 3/36* (2006.01)

(52) U.S. Cl.
CPC .................................... *H01Q 3/36* (2013.01)

(58) Field of Classification Search
CPC .................... H01Q 1/38; H01Q 1/243; H05K 2201/10098; H05K 2201/042; H05K 1/189; H05K 1/147; H05K 1/0243; H05K 1/028; H05K 3/4691; G01S 2013/0254; G01S 7/032
USPC .................. 342/371, 368; 361/749; 343/853
See application file for complete search history.

(56) References Cited

U.S. PATENT DOCUMENTS

| | | | |
|---|---|---|---|
| 3,697,998 A | 10/1972 | Schaufelberger | |
| 6,098,547 A | 8/2000 | West | |
| 6,937,194 B1 | 8/2005 | Meier et al. | |
| 6,972,727 B1 | 12/2005 | West et al. | |
| 7,605,679 B1 * | 10/2009 | Doane | H01P 1/02 333/34 |
| 8,159,403 B1 | 4/2012 | Chen et al. | |
| 8,598,969 B1 | 12/2013 | Walker et al. | |
| 8,743,015 B1 | 6/2014 | West et al. | |
| 9,113,845 B2 * | 8/2015 | Gilad | H05K 1/189 |
| 9,620,866 B2 | 4/2017 | Chang et al. | |
| 10,064,276 B2 * | 8/2018 | Williams | H05K 3/4691 |
| 10,381,743 B2 | 8/2019 | Bialer et al. | |
| 10,454,183 B1 | 10/2019 | Wolf et al. | |
| 10,498,015 B2 | 12/2019 | Handy et al. | |
| 10,558,108 B2 * | 2/2020 | Joo | H05K 1/0271 |
| 10,673,148 B1 | 6/2020 | West | |
| 10,827,249 B1 * | 11/2020 | Pine | H04R 1/1041 |

(Continued)

OTHER PUBLICATIONS

Conformal Adaptive Phased Array for the 2.4 GHz ISM band by Le Goff (Year: 2020).*

*Primary Examiner* — Michael W Justice
(74) *Attorney, Agent, or Firm* — Suiter Swantz IP

(57) ABSTRACT

A doubly conformal AESA includes circuit cards with first and second printed circuit board (PCB) sections. The first PCB sections include radiating elements which define linear arrays which are disposed on a curved surface, or a first curve of the doubly conformal AESA. The second PCB sections include transmit/receive modules which control the radiating elements. The circuit cards may include flex-rigid connections which connect the first PCB sections and the second PCB sections, thereby defining a second curve of the doubly conformal AESA. The circuit cards may also be connected to a backplane via angled array, thereby defining the second curve of the doubly conformal AESA.

15 Claims, 22 Drawing Sheets

(56) References Cited

U.S. PATENT DOCUMENTS

| | | | | |
|---|---|---|---|---|
| 10,868,362 | B2 * | 12/2020 | Yun | H01Q 21/065 |
| 10,935,656 | B2 * | 3/2021 | Yu | G01S 13/93 |
| 10,938,105 | B2 | 3/2021 | Snyder et al. | |
| 10,950,939 | B2 | 3/2021 | West | |
| 11,075,440 | B2 * | 7/2021 | Xia | H01Q 21/065 |
| 11,223,120 | B2 * | 1/2022 | Ueda | H01Q 1/38 |
| 11,239,573 | B2 * | 2/2022 | Shah | H01Q 23/00 |
| 11,309,618 | B2 | 4/2022 | Säily et al. | |
| 11,335,652 | B2 * | 5/2022 | Vincent | H10W 44/20 |
| 11,397,284 | B2 | 7/2022 | Dabrowski et al. | |
| 11,581,635 | B2 * | 2/2023 | Sudo | H01Q 25/001 |
| 11,688,948 | B2 | 6/2023 | Kozyrev et al. | |
| 11,764,489 | B2 * | 9/2023 | Shah | H01Q 9/0407 343/702 |
| 12,057,647 | B2 * | 8/2024 | Liao | H01Q 1/38 |
| 2010/0174141 | A1 * | 7/2010 | Gilad | A61B 5/6861 29/729 |
| 2010/0177011 | A1 | 7/2010 | Sego et al. | |
| 2017/0118838 | A1 * | 4/2017 | Williams | H05K 3/361 |
| 2020/0021015 | A1 * | 1/2020 | Yun | H01Q 1/2283 |
| 2020/0052373 | A1 * | 2/2020 | Xia | H01Q 21/065 |
| 2020/0243957 | A1 * | 7/2020 | Ueda | H01Q 1/38 |
| 2020/0249343 | A1 * | 8/2020 | Yu | G01S 13/93 |
| 2021/0014598 | A1 * | 1/2021 | Pine | H04R 1/1041 |
| 2021/0035927 | A1 * | 2/2021 | Vincent | H10W 44/20 |
| 2021/0057812 | A1 * | 2/2021 | Yun | H01Q 21/06 |
| 2021/0111485 | A1 | 4/2021 | Mak et al. | |
| 2021/0151874 | A1 * | 5/2021 | Sudo | H01Q 21/065 |
| 2021/0194148 | A1 | 6/2021 | West et al. | |
| 2021/0234259 | A1 * | 7/2021 | Son | H04B 1/40 |
| 2021/0305720 | A1 * | 9/2021 | Zhang | H01Q 1/38 |
| 2021/0376493 | A1 * | 12/2021 | Shah | H01Q 1/38 |
| 2021/0391641 | A1 * | 12/2021 | Son | H04B 1/40 |
| 2022/0131281 | A1 * | 4/2022 | Shah | H01Q 25/00 |
| 2022/0224065 | A1 | 7/2022 | Wilcoxon et al. | |
| 2022/0308165 | A1 | 9/2022 | Teague et al. | |
| 2022/0359990 | A1 | 11/2022 | Boryssenko | |
| 2022/0369460 | A1 | 11/2022 | Chuah et al. | |
| 2023/0048611 | A1 * | 2/2023 | Pajona | H01Q 21/20 |
| 2024/0014565 | A1 * | 1/2024 | Liao | H01Q 1/38 |
| 2024/0061073 | A1 * | 2/2024 | Park | G01S 7/027 |
| 2024/0131396 | A1 * | 4/2024 | Marris | A63B 24/0021 |
| 2024/0226657 | A9 * | 7/2024 | Marris | A63B 24/0021 |
| 2025/0338395 | A1 * | 10/2025 | Johnson | H01P 3/085 |

* cited by examiner

100

100

100

100

100

100

100

100

100

100

100

100

DOUBLY CONFORMAL CARD-BASED AESA ARCHITECTURE

TECHNICAL FIELD

The present invention generally relates to antenna arrays, and more specifically to feeding systems for antenna arrays.

BACKGROUND

Two-dimensional conformal arrays with planar printed circuit board (PCB) facets may require numerous cabled radio frequency, direct current, and control signal distribution routing through complicated, bulky, environmentally fragile, and expensive sub-assemblies. Planar tiled PCB based two-dimensional conformal arrays are unit cell size/z-height limited due to the thickness of the PCB and are bandwidth limited. Space-fed hemispherical/partially hemispherical AEA lenses are very thick due to the required f/d ratio (focal length-to-array diameter) required for proper AESA lens illumination. Therefore, it would be advantageous to provide a device, system, and method that cures the shortcomings described above.

SUMMARY

In some aspects, the techniques described herein relate to a doubly conformal active electronically scanned array including: a plurality of circuit cards each including: a first printed circuit board section including: a substrate; wherein the substrate defines a curved edge; a plurality of radiating elements; wherein the plurality of radiating elements are arranged in a linear array on the curved edge such that the linear array is one-dimensionally conformal; and a plurality of transmission lines; a second printed circuit board section including: a plurality of transmit/receive modules; and a first layer combiner; and one or more rigid-flex connections; wherein the one or more rigid-flex connections connect the first printed circuit board section with the second printed circuit board section such that the first printed circuit board section is configured to bend relative to the second printed circuit board section about the one or more rigid-flex connections; wherein the plurality of radiating elements are connected to the plurality of transmit/receive modules through the plurality of transmission lines and the one or more rigid-flex connections; a backplane including: a plurality of array connectors; wherein the second printed circuit board section of the plurality of circuit cards are connected to the plurality of array connectors; and a second layer combiner; and a chassis including an upper card cage and a plurality of alignment rails; wherein the plurality of alignment rails are not aligned in parallel; wherein the first printed circuit board section of the plurality of circuit cards are disposed in the plurality of alignment rails.

In some aspects, the techniques described herein relate to a doubly conformal active electronically scanned array, wherein the curved edge is a convex curved edge.

In some aspects, the techniques described herein relate to a doubly conformal active electronically scanned array, wherein the substrate defines a plurality of cut-outs; wherein the plurality of transmission lines are disposed around the plurality of cut-outs.

In some aspects, the techniques described herein relate to a doubly conformal active electronically scanned array, wherein the first layer combiner is connected between the plurality of transmit/receive modules and the plurality of array connectors; wherein the first layer combiner is configured to combine signals from the plurality of transmit/receive modules.

In some aspects, the techniques described herein relate to a doubly conformal active electronically scanned array, wherein the second layer combiner is connected to the first layer combiner of the second printed circuit board section of each of the plurality of circuit cards through the plurality of array connectors; wherein the second layer combiner is configured to combine signals from the first layer combiner of the second printed circuit board section of each of the plurality of circuit cards.

In some aspects, the techniques described herein relate to a doubly conformal active electronically scanned array, wherein at least one of the first layer combiner and the second layer combiner include corporate radio frequency feed manifolds.

In some aspects, the techniques described herein relate to a doubly conformal active electronically scanned array, including a matching number of the plurality of circuit cards and the plurality of array connectors.

In some aspects, the techniques described herein relate to a doubly conformal active electronically scanned array, wherein the upper card cage is one of a radome, a frequency selective surface radome, or a wide-angle impedance matching radome with an integrated polarizer.

In some aspects, the techniques described herein relate to a doubly conformal active electronically scanned array, wherein the chassis includes a flange and a lower card cage; wherein the flange extends outwards from the upper card cage and the lower card cage; wherein the flange is disposed between the upper card cage and the lower card cage; wherein the second printed circuit board section and the backplane are disposed in the lower card cage.

In some aspects, the techniques described herein relate to a doubly conformal active electronically scanned array, wherein the second printed circuit board section of the plurality of circuit cards are aligned in parallel; wherein the second printed circuit board section of the plurality of circuit cards are orthogonal to the backplane.

In some aspects, the techniques described herein relate to a doubly conformal active electronically scanned array, wherein the plurality of radiating elements are arranged in the linear array on the curved edge with a lattice spacing; wherein the plurality of alignment rails maintain the plurality of radiating elements with the lattice spacing between adjacent of the plurality of circuit cards.

In some aspects, the techniques described herein relate to a doubly conformal active electronically scanned array, wherein the doubly conformal active electronically scanned array is configured for frequencies in at least one of a C-band, an X-band, a Ku-band, a K-band, a Ka-band, or a V-band.

In some aspects, the techniques described herein relate to a doubly conformal active electronically scanned array, wherein the one or more rigid-flex connections are defined in a straight line between the first printed circuit board section and the second printed circuit board section.

In some aspects, the techniques described herein relate to a doubly conformal active electronically scanned array, wherein the one or more rigid-flex connections are defined in a curved line between the first printed circuit board section and the second printed circuit board section; wherein the substrate includes a plurality of tabs; wherein the plurality of tabs are configured to independently bend about the one or more rigid-flex connections; wherein the plurality of tabs define the curved edge on which the plurality of radiating elements are disposed.

In some aspects, the techniques described herein relate to a doubly conformal active electronically scanned array, wherein the plurality of alignment rails fan out from a center of the upper card cage.

In some aspects, the techniques described herein relate to a doubly conformal active electronically scanned array including: a plurality of circuit cards each including: a first printed circuit board section including: a substrate; wherein the substrate defines a curved edge; a plurality of radiating elements; wherein the plurality of radiating elements are arranged in a linear array on the curved edge such that the linear array is one-dimensionally conformal; and a plurality of transmission lines; and a second printed circuit board section, wherein the second printed circuit board section includes: a plurality of transmit/receive modules; wherein the plurality of radiating elements are connected to the plurality of transmit/receive modules through the plurality of transmission lines; and a first layer combiner; a backplane including: a plurality of array connectors; wherein the second printed circuit board section of the plurality of circuit cards are connected to the plurality of array connectors; wherein the second printed circuit board section of the plurality of circuit cards are not aligned in parallel; and a second layer combiner; and a chassis including an upper card cage and a plurality of alignment rails; wherein the plurality of alignment rails are not aligned in parallel; wherein the first printed circuit board section of the plurality of circuit cards are disposed in the plurality of alignment rails.

In some aspects, the techniques described herein relate to a doubly conformal active electronically scanned array, wherein the first printed circuit board section is fixed to and co-planar with the second printed circuit board section.

In some aspects, the techniques described herein relate to a doubly conformal active electronically scanned array, wherein at least some of the plurality of array connectors are angled array connectors.

In some aspects, the techniques described herein relate to a doubly conformal active electronically scanned array, wherein a center array connector of the plurality of array connectors is a non-angled array connector; wherein a remainder of plurality of array connectors are the angled array connectors.

In some aspects, the techniques described herein relate to a doubly conformal active electronically scanned array, wherein the angled array connectors are symmetric about the center array connector.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
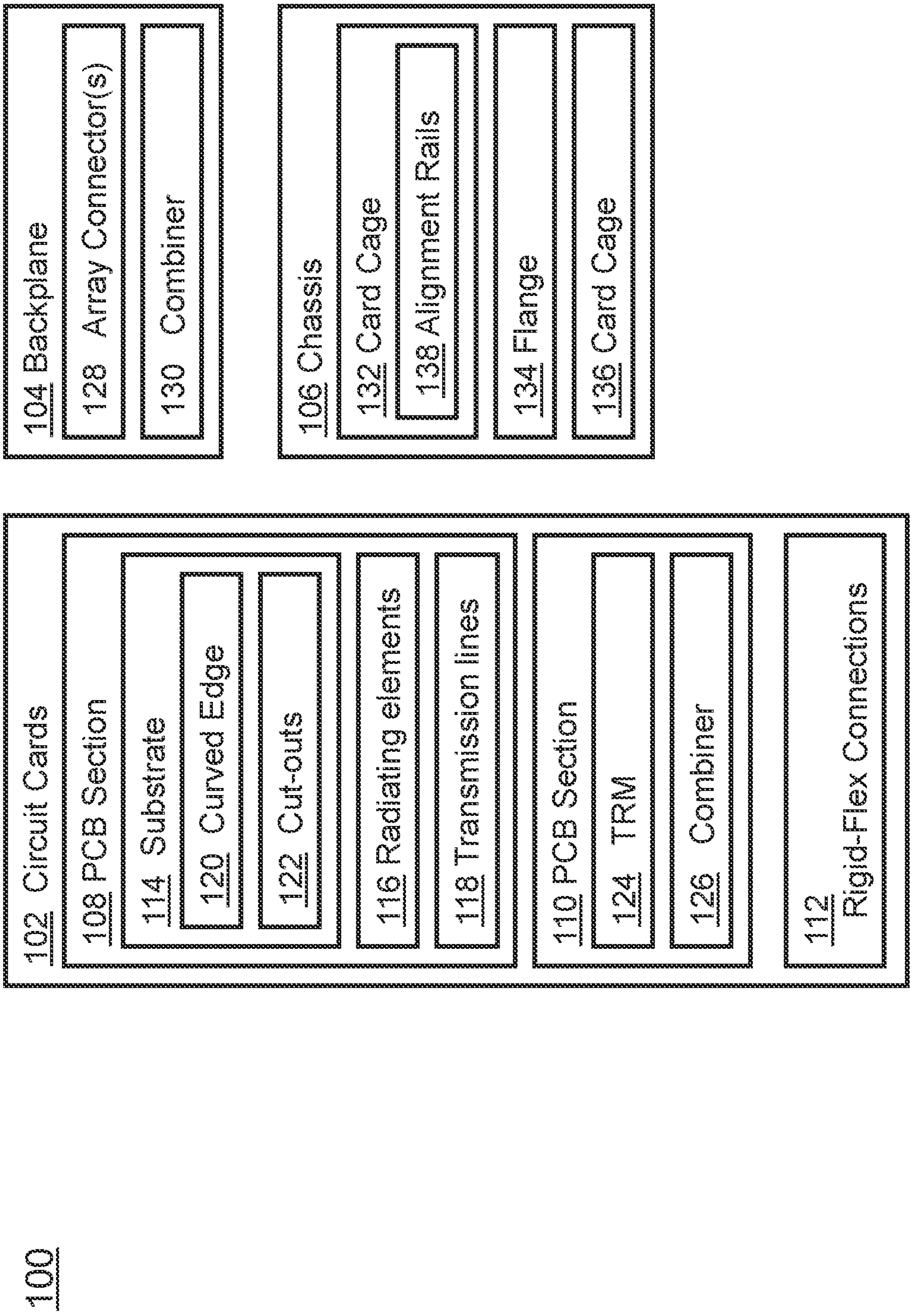
FIG. 1A depicts a simplified block diagram of a doubly conformal active electronically scanned array (AESA), in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Antenna arrays are described in: U.S. Patent Publication Number US20210194148A1, titled "Spherical space feed for antenna array systems and methods"; U.S. Pat. No. 10,950,939B2, titled "Systems and methods for ultra-ultra-wide band AESA"; U.S. Pat. No. 10,454,183B1, titled "Multi-tile AESA systems and methods"; U.S. Pat. No. 7,605,679B1, titled "System and method for providing a non-planar stripline transition"; U.S. Pat. No. 10,381,743B2, titled "Curved sensor array for improved angular resolution"; U.S. Pat. No. 8,743,015B1, titled "Omni-directional ultra wide band miniature doubly curved antenna array"; U.S. Patent Publication Number US20220369460A1, titled "Three dimensional foldable substrate with vertical side interface"; are incorporated herein by reference in the entirety.

Reference will now be made in detail to the subject matter disclosed, which is illustrated in the accompanying drawings. Embodiments of the present disclosure are generally directed to a doubly conformal card-based active electronically scanned array (AESA) architecture. A doubly conformal AESA includes circuit cards with first and second printed circuit board (PCB) sections. The first PCB sections include radiating elements which define linear arrays which are disposed on a curved surface, or a first curve of the doubly conformal AESA. The second PCB sections include transmit/receive modules which control the radiating elements. The circuit cards may include flex-rigid connections which connect the first PCB sections and the second PCB sections, thereby defining a second curve of the doubly conformal AESA. The circuit cards may also be connected to a backplane via an angled array connector, thereby defining the second curve of the doubly conformal AESA.

Figure 1B:
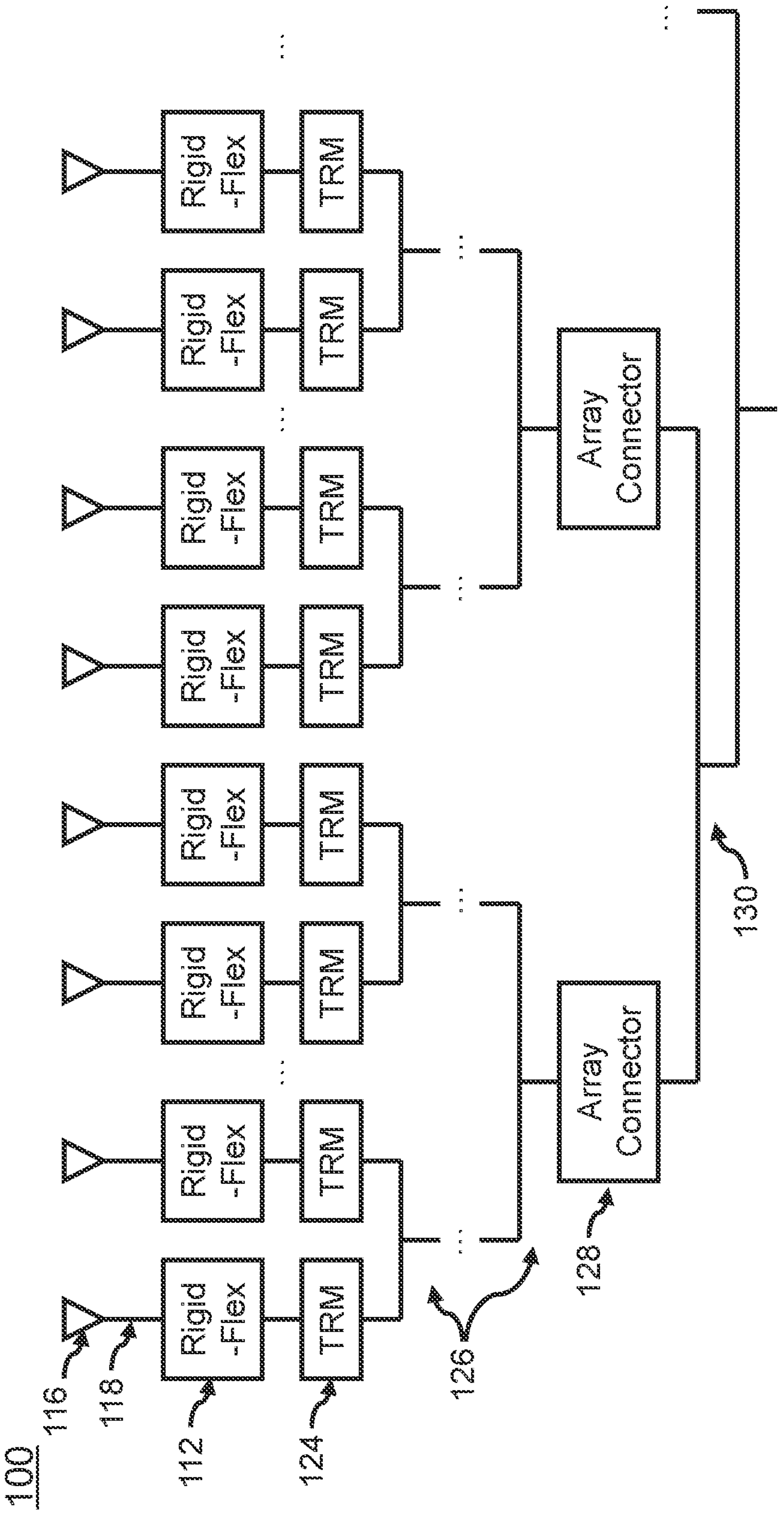
FIG. 1B depicts a simplified circuit diagram of a doubly conformal AESA, in accordance with one or more embodiments of the present disclosure.
Figure 2A:
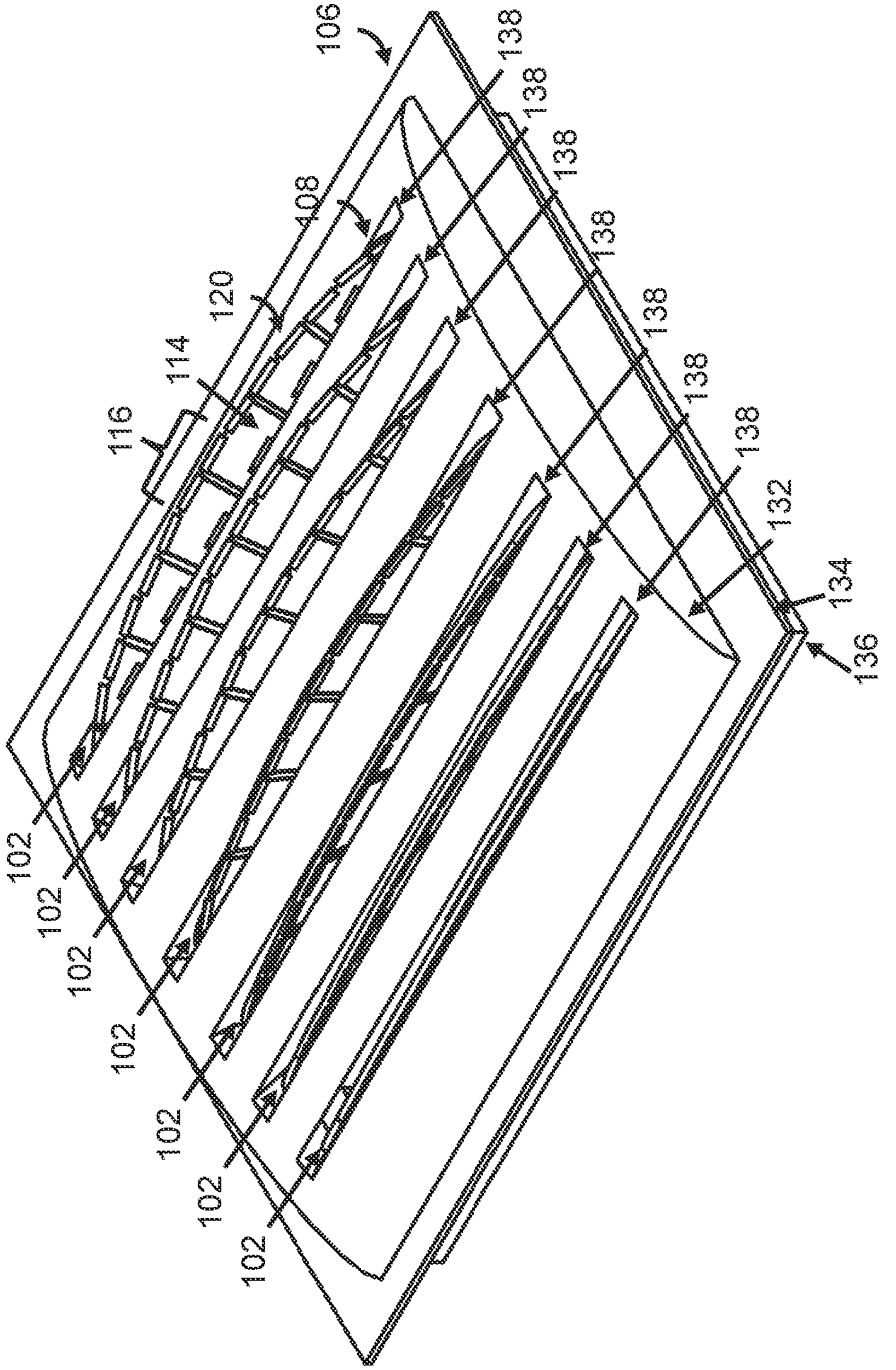
FIG. 2A depicts a perspective view of an exemplary doubly conformal AESA, in accordance with one or more embodiments of the present disclosure.
Figure 2B:
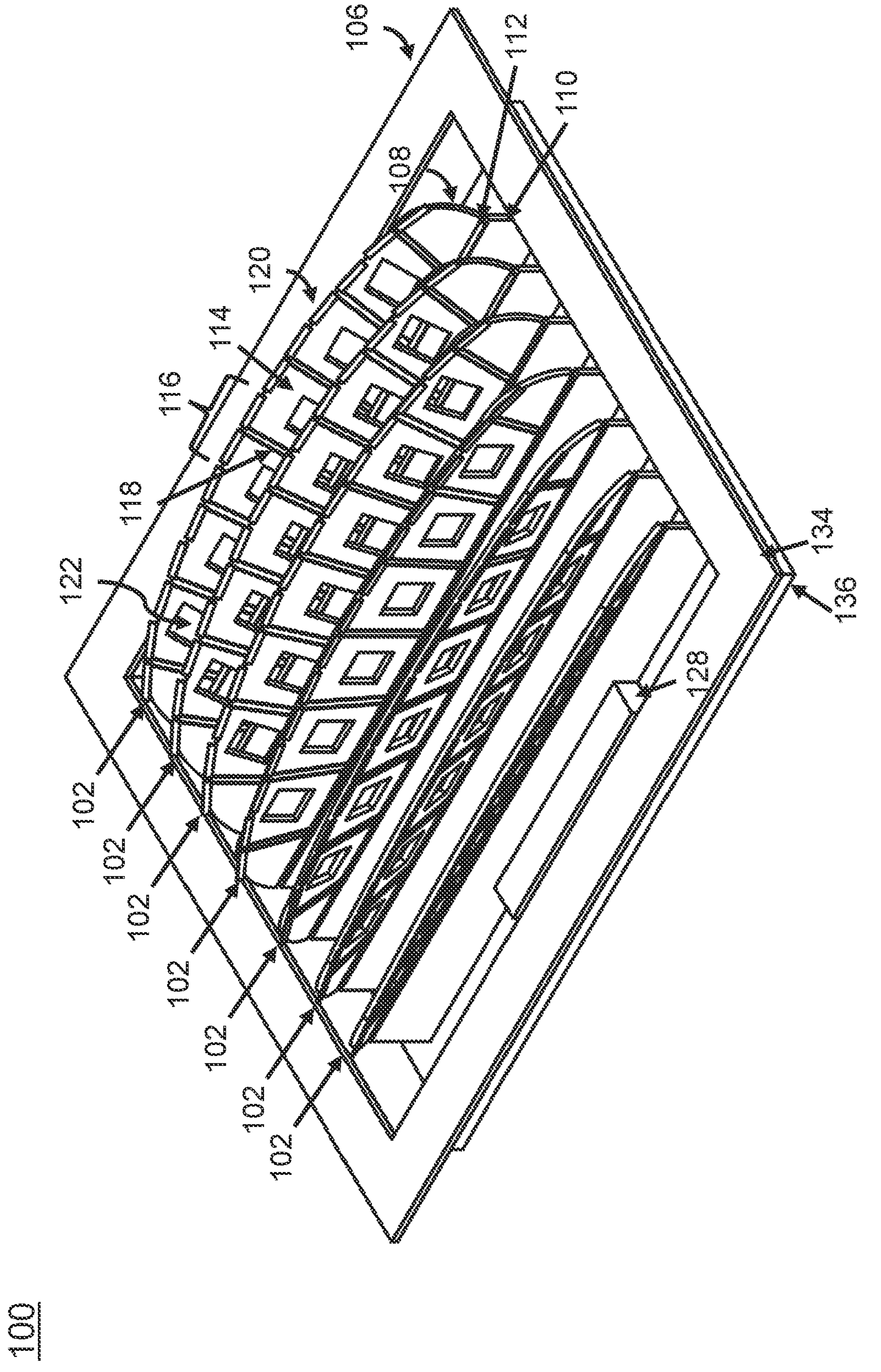
FIG. 2B depicts a perspective view of an exemplary doubly conformal AESA with an upper card cage which is hidden, in accordance with one or more embodiments of the present disclosure.
Figure 2C:
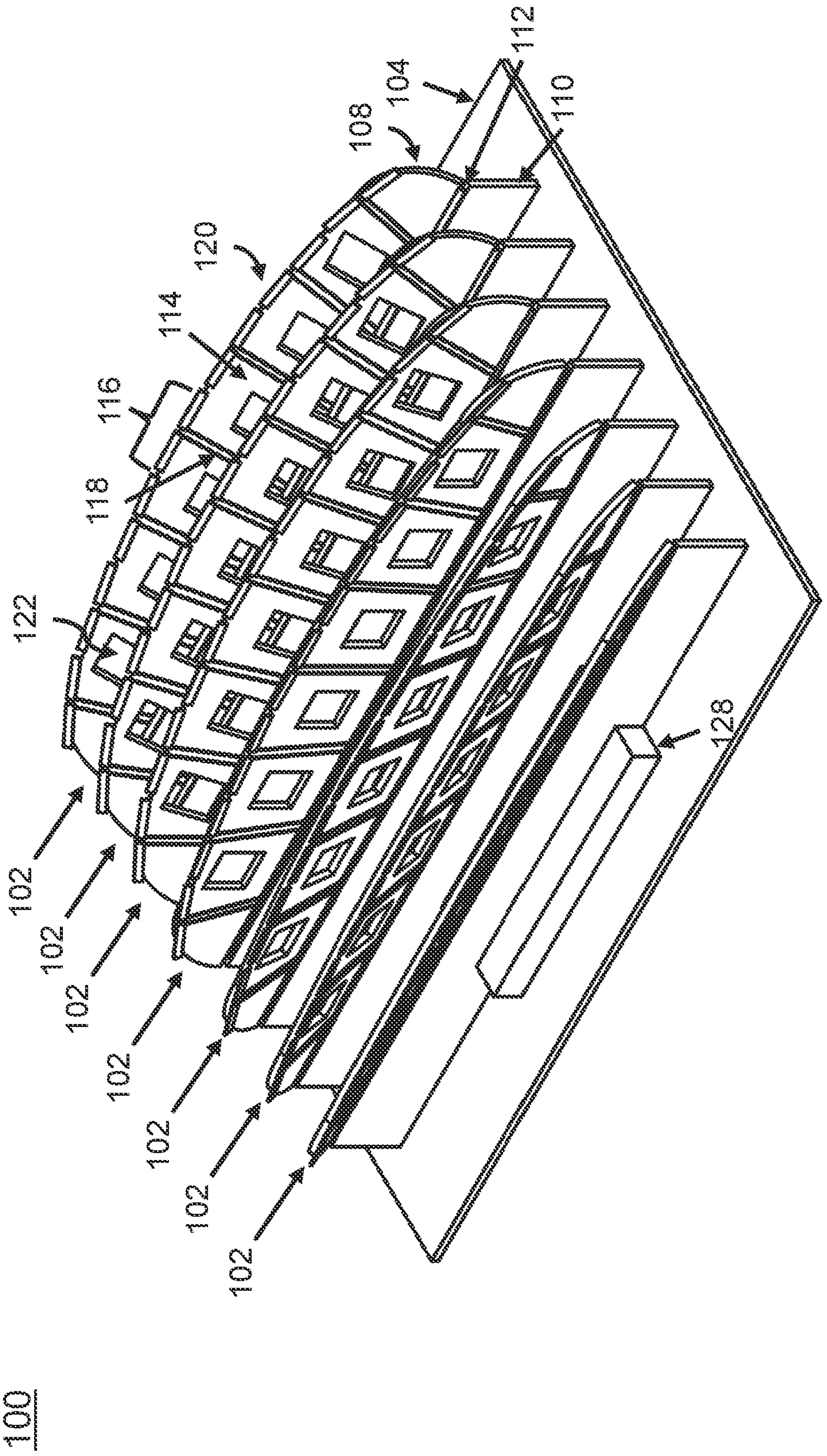
FIG. 2C depicts a perspective view of an exemplary doubly conformal AESA with a chassis which is hidden, in accordance with one or more embodiments of the present disclosure.
Figure 2D:
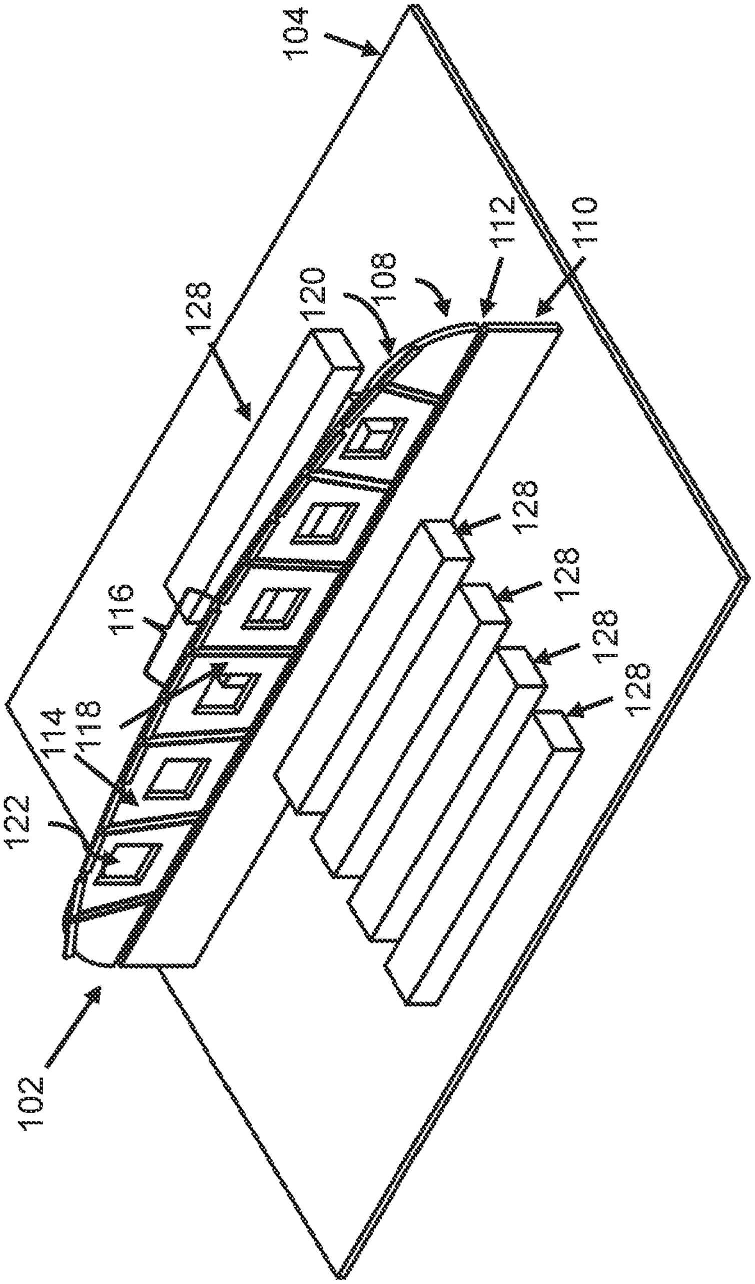
FIG. 2D depicts a perspective view of an exemplary doubly conformal AESA with a chassis and several circuit cards which are hidden, in accordance with one or more embodiments of the present disclosure.
Figure 2E:
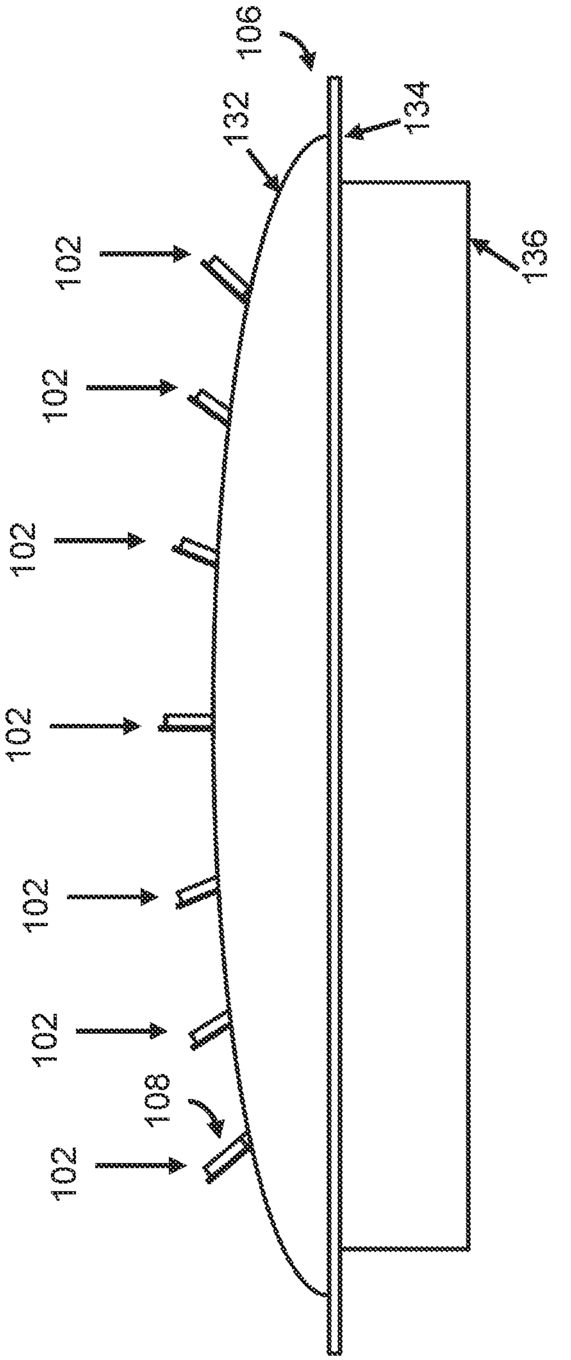
FIG. 2E depicts a front view of an exemplary doubly conformal AESA, in accordance with one or more embodiments of the present disclosure.
Figure 2F:
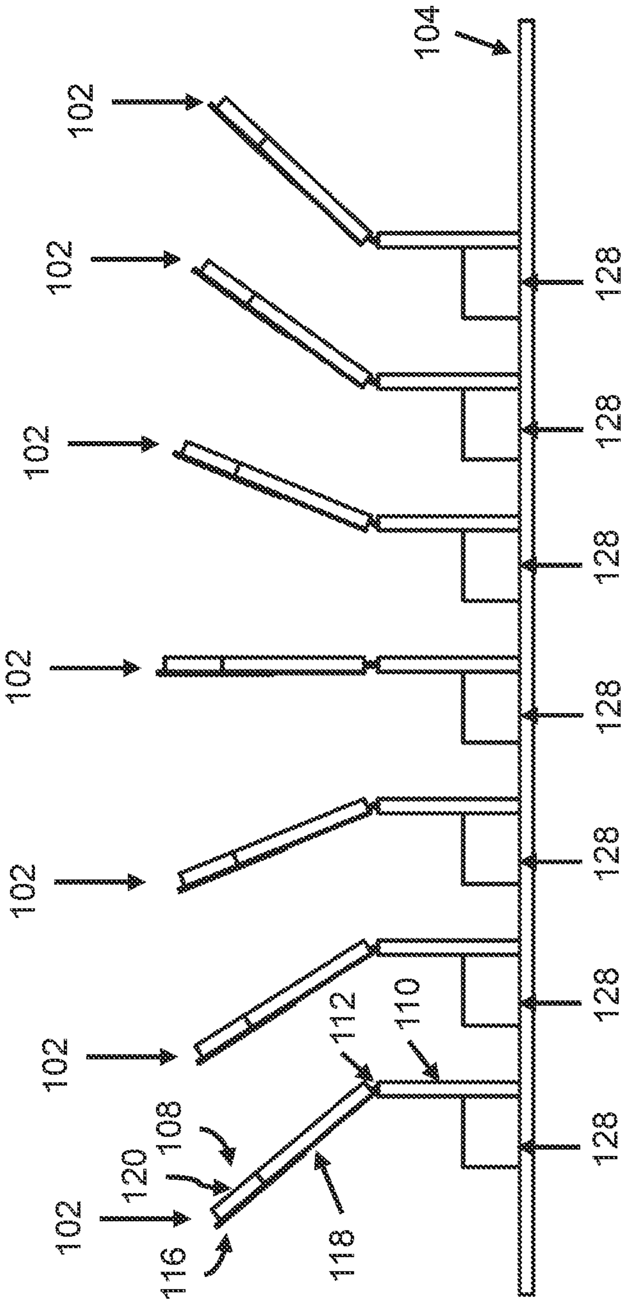
FIG. 2F depicts a front view of an exemplary doubly conformal AESA with a chassis which is hidden, in accordance with one or more embodiments of the present disclosure.
Figure 2G:
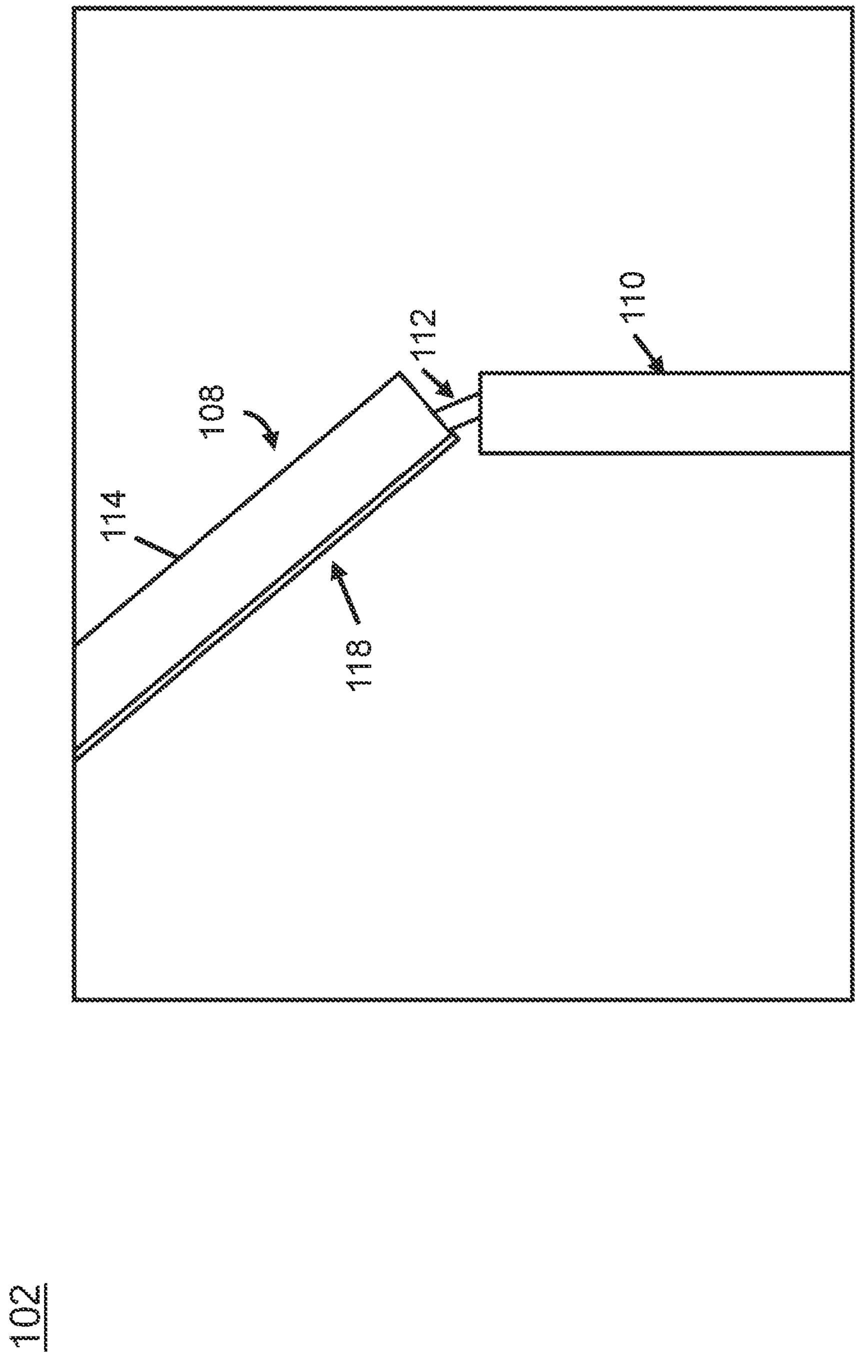
FIG. 2G depicts a partial front view of a circuit card of an exemplary doubly conformal AESA, in accordance with one or more embodiments of the present disclosure.
Figure 2H:
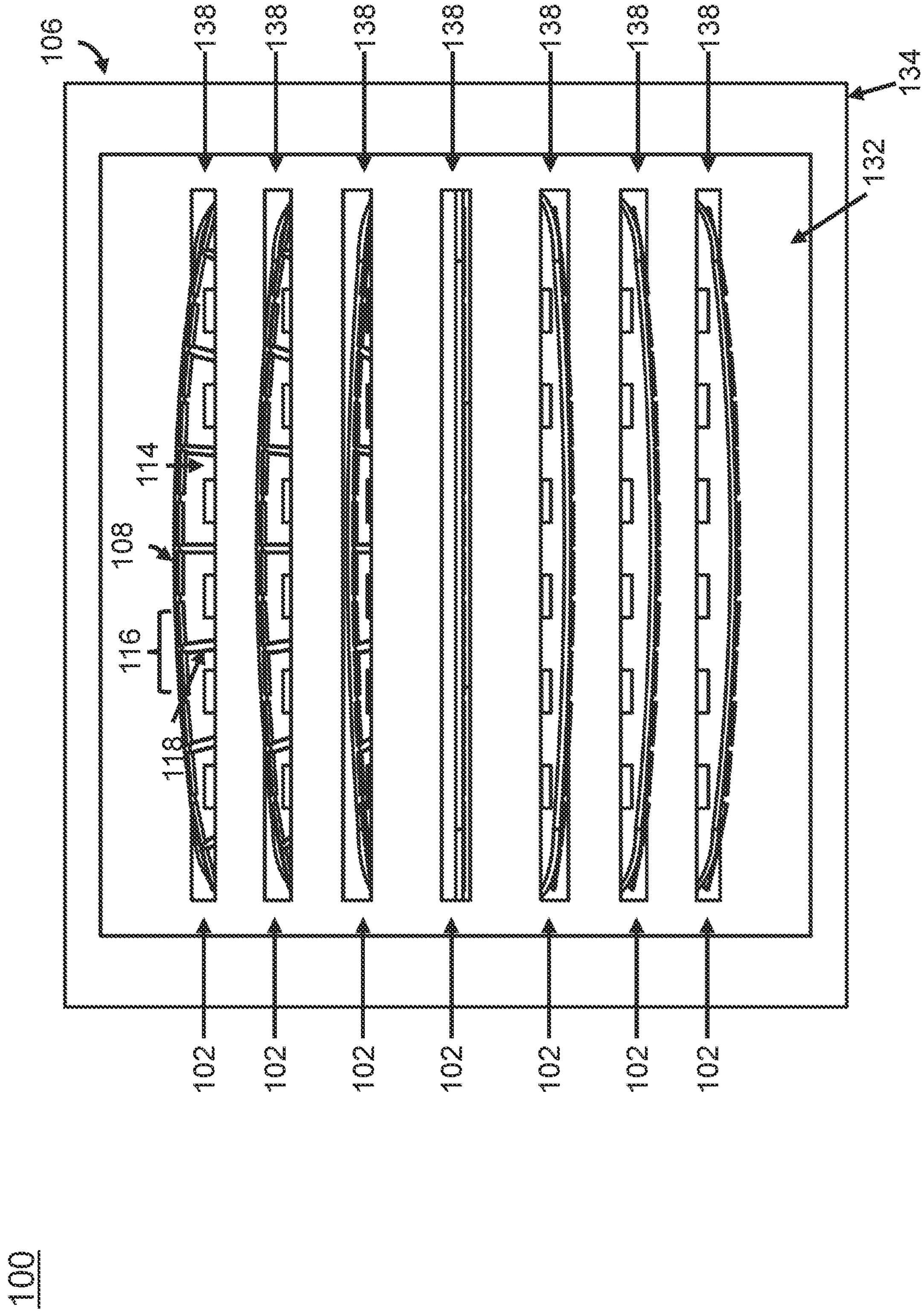
FIG. 2H depicts a top view of an exemplary doubly conformal AESA, in accordance with one or more embodiments of the present disclosure.
Figure 2I:
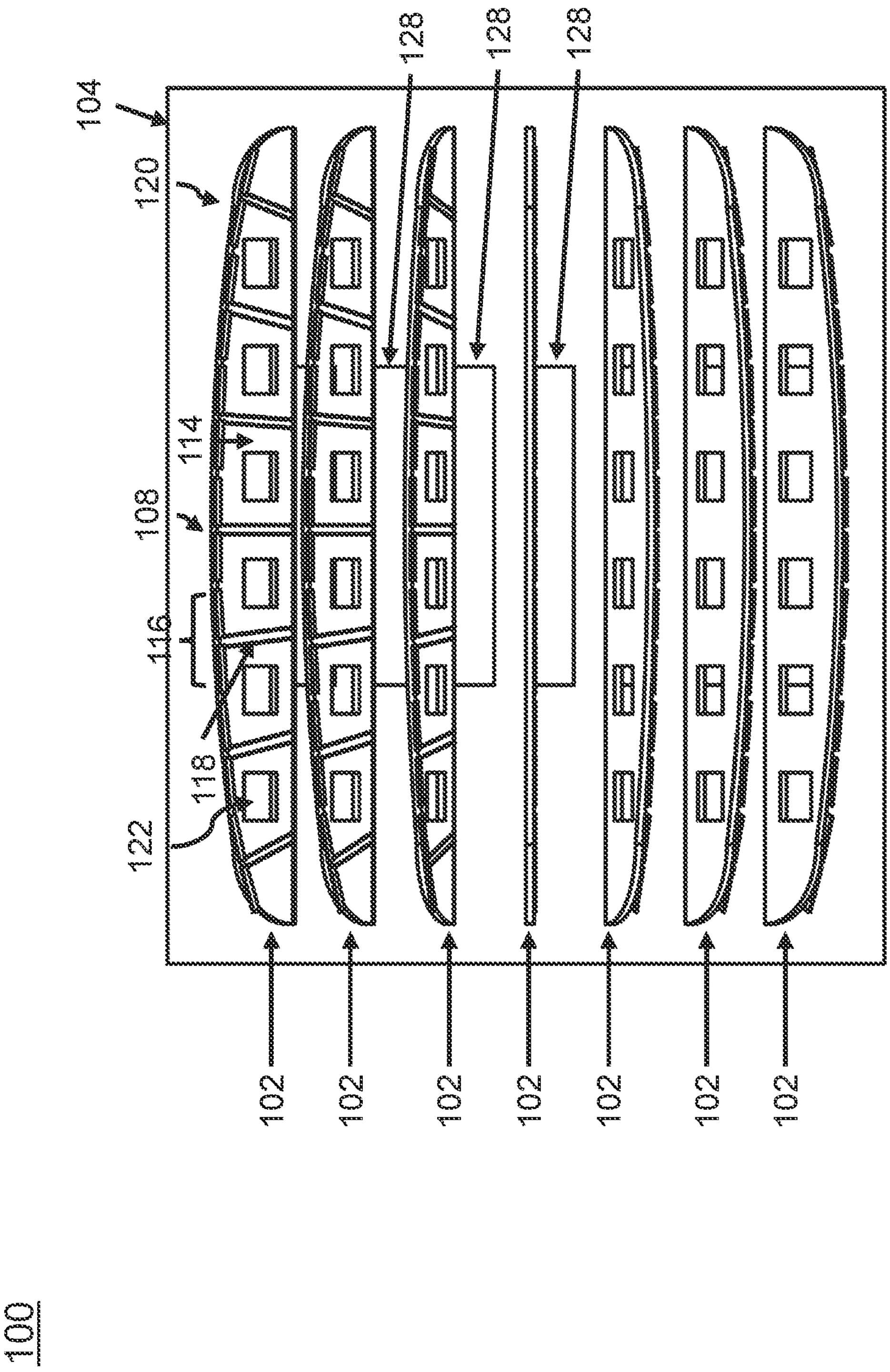
FIG. 2I depicts a top view of an exemplary doubly conformal AESA with a chassis which is hidden, in accordance with one or more embodiments of the present disclosure.
Figure 2J:
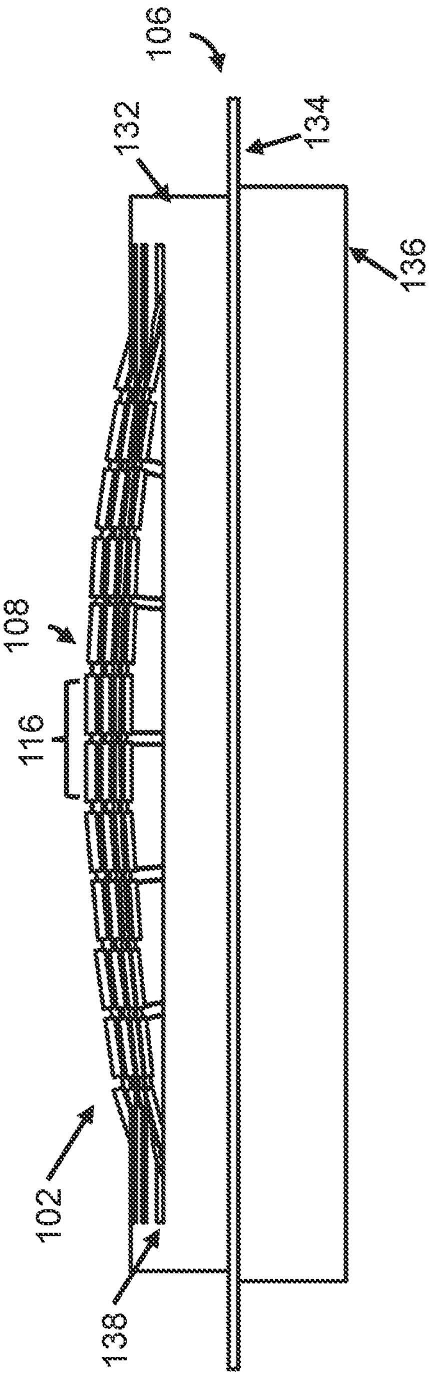
FIG. 2J depicts a side view of an exemplary doubly conformal AESA, in accordance with one or more embodiments of the present disclosure.
Figure 2K:
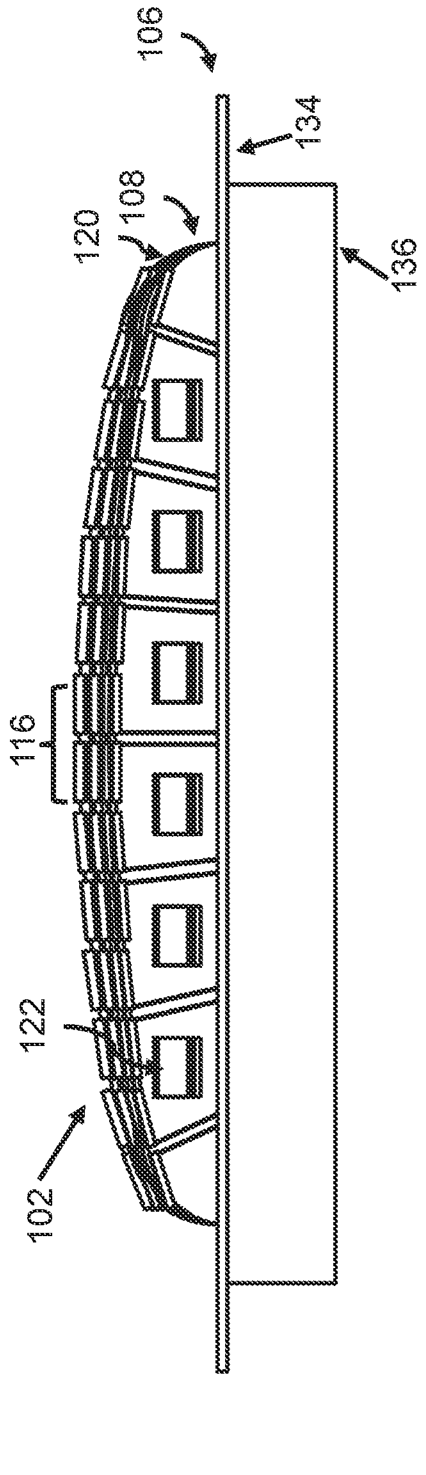
FIG. 2K depicts a side view of an exemplary doubly conformal AESA with an upper card cage which is hidden, in accordance with one or more embodiments of the present disclosure.
Figure 2L:
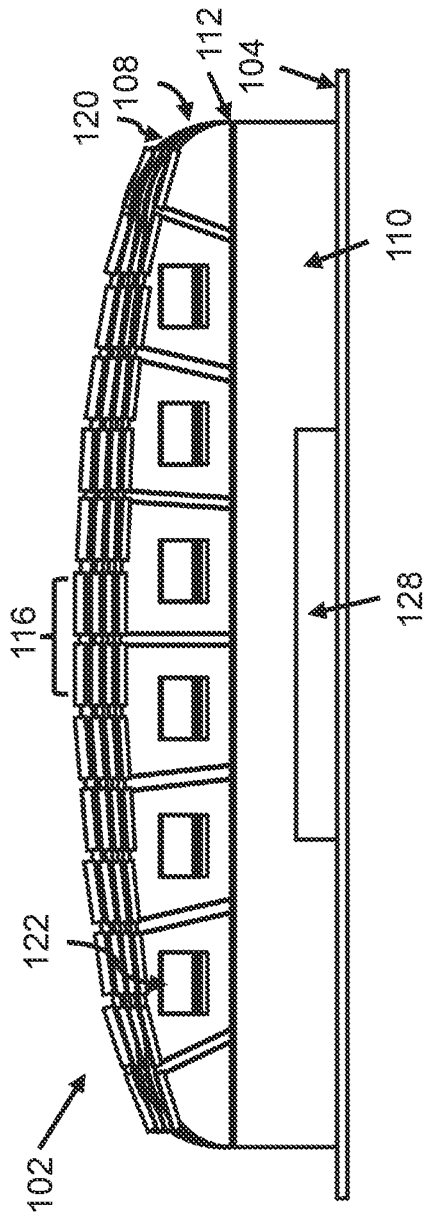
FIG. 2L depicts a side view of an exemplary doubly conformal AESA with a chassis which is hidden, in accordance with one or more embodiments of the present disclosure.
Figure 2M:
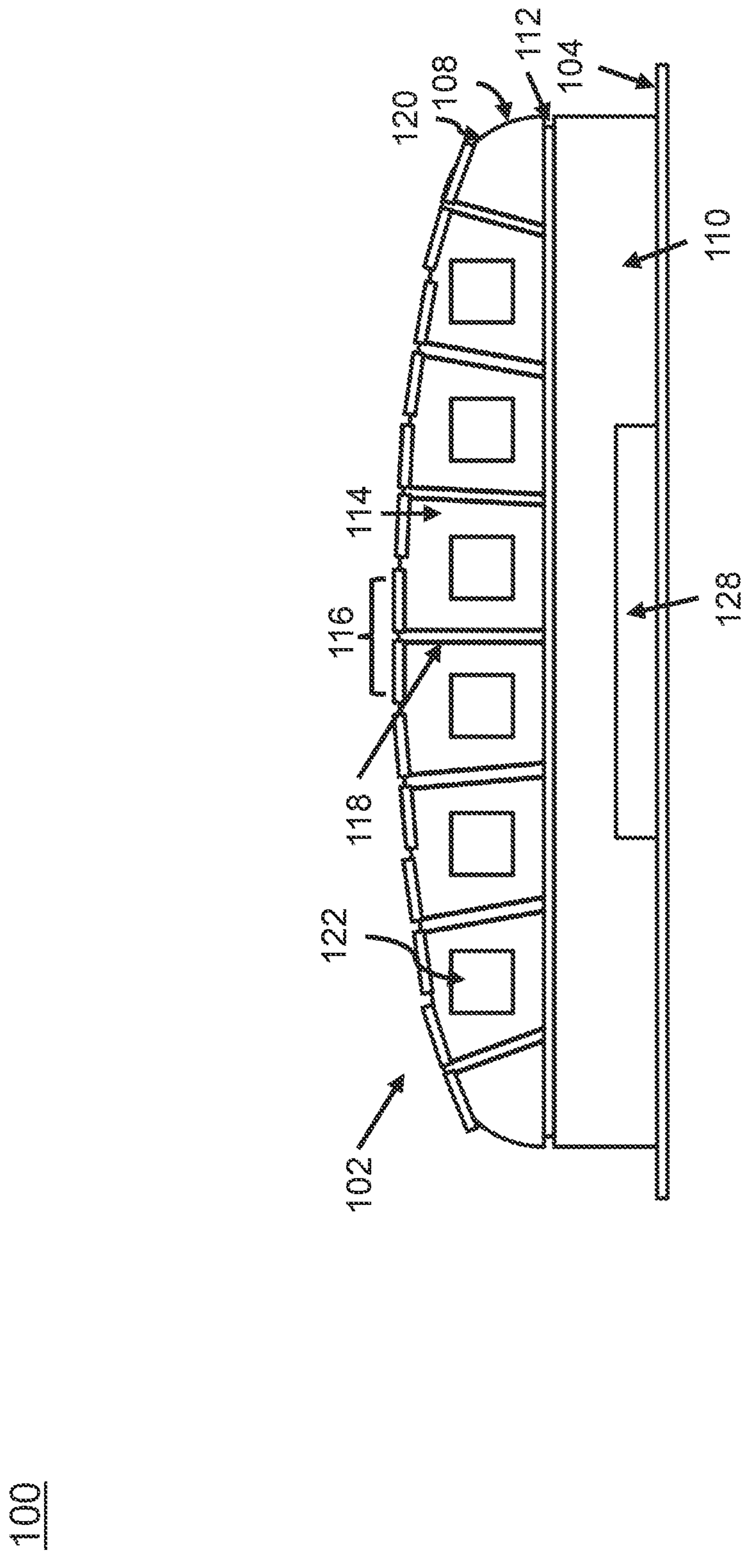
FIG. 2M depicts a side view of an exemplary doubly conformal AESA with a chassis and several circuit cards which are hidden, in accordance with one or more embodiments of the present disclosure.

Referring now to FIGS. 1A-1B, a doubly conformal active electronically scanned array (AESA) 100 is described, in accordance with one or more embodiments of the present disclosure. The doubly conformal AESA 100 may include a card-based architecture. The doubly conformal AESA 100 may include one or more components, such as, but not limited to, circuit cards 102, a backplane 104, a chassis 106, and the like.

The doubly conformal AESA 100 may include the circuit cards 102. The circuit cards 102 may also be referred to as subarray cards, 1D "curved" PCB "card" self-contained linear arrays, or the like. The circuit cards 102 may include one or more components, such as, but not limited to, a first PCB section 108, a second PCB section 110, one or more rigid-flex connections 112, and the like.

The circuit cards 102 may include the first PCB section 108. The first PCB section 108 may be a first printed circuit board. The first PCB section 108 may include one or more components, such as, but not limited to, a substrate 114, radiating elements 116, transmission lines 118, and the like. In embodiments, the first PCB section 108 is a passive PCB section. The first PCB section 108 may be considered passive in that the first PCB section 108 may not include any active electronic devices. The first PCB section 108 may include one or more passive electronic devices (e.g., resistors, capacitors, inductors, etc.). It is further contemplated that the first PCB section 108 may include one or more active electronic devices.

The first PCB section 108 may include the substrate 114. The substrate 114 may define a curved edge 120. In this regard, the first PCB section 108 may be considered a curved PCB. The curved edge 120 may be a convex curved edge. The convex curved edge may be of an angle suitable for chassis and/or aerodynamic requirements.

The first PCB section 108 may include the radiating elements 116. The radiating elements 116 may be disposed on the substrate 114. For example, the radiating elements 116 may be disposed on the curved edge 120. The curved edge 120 may include a sufficient width and curvature to support a select number of the radiating elements 116 with a lattice spacing between the radiating elements 116. The radiating elements 116 may be arranged in a linear array on the curved edge 120. The radiating elements 116 may form the linear array by being arranged in a line on the curved edge 120. For example, the linear array may be one-dimensionally (1D) conformal. The linear array may conform to a one-dimensional shape, such as the curved edge 120. The radiating elements 116 may thus be curved in nature to obtain a wide field-of-view In this regard, the linear array defined by the radiating elements 116 may be a convex semicircular array.

The radiating elements 116 may be configured to operate at one or more frequencies. The radiating elements 116 may be arranged in the linear array on the curved edge with the lattice spacing. The radiating elements 116 may include the lattice spacing to adjacent of the radiating elements based on the operating frequency. In particular, the lattice spacing between the radiating elements 116 is a function of the wavelength at which the elements transmit/receive radio signals. The operating frequency of the radiating elements 116 depends on the lattice spacing between the radiating elements 116 as a function of one-half the wavelength. In embodiments, the radiating elements 116 include a one-half wavelength spacing between adjacent of the radiating elements 116. The spacing may be less than or equal to one-half of the highest frequency for which the doubly conformal AESA 100 and the circuit cards are configured. As the wavelengths decrease for higher frequencies, the spacing between the radiating elements 116 and the number of the radiating elements 116 per area similarly decreases. The radiating elements 116 may be disposed on the substrate 114 with the spacing. The radiating elements 116 may be disposed on the curved edge 120 with the lattice spacing.

A power, frequency, phase, time delay, and the like of the radiating elements 116 may be electronically controlled to produce a system of one or more antennas that can transmit and/or receive one or more signals at different angles. The antennas may form one or more beams. The angular position of the beam is electronically redirected by controlling the phases and/or time delay of the radiating elements 116. In this regard, the radiating elements 116 may form an electronically scanned array. The signals may be transmitted and/or received while the orientation of the radiating elements 116 are fixed. In this regard, the doubly conformal AESA 100 may or may not be a mechanically scanned array.

The circuit cards 102 may include the second PCB section 110. The second PCB section 110 may be a second printed circuit board. The second PCB section 110 may be considered active in that the second PCB section 110 may include one or more active electronic devices (e.g., Radio Frequency Integrated Circuit-base TRMs and Beam former RFICs (BFIC), diodes or transistors). The second PCB section 110 may include one or more components, such as, but not limited to, transmit/receive modules 124 (TRMs), a first layer combiner 126, voltage regulators (not depicted), and the like.

The second PCB section 110 may include the transmit/receive modules 124. The transmit/receive modules 124 may be transceiver radio frequency integrated circuits (RFICs), beamforming networks (BFNs) and the like.

The transmit/receive modules 124 may cause the radiating elements 116 to transmit and/or receive radio frequency ("RF") signals. The transmit/receive modules 124 may be connected to a respective of the radiating elements 116. The transmit/receive modules 124 may provide one-to-one control of the radiating elements 116. For example, each radiating elements 116 may be connected to the respective of the transmit/receive modules 124 to provide the one-to-one control. The transmit/receive modules 124 may control the power, frequency, phase, time delay, and the like of the radiating elements 116 to which the transmit/receive modules 124 is connected. The transmit/receive modules 124 may amplify the signals into/out of the radiating elements 116. The transmit/receive modules 124 may also switch the radiating elements 116 between transmitting and receiving the signals.

The transmit/receive modules 124 may include one or more electronic components, such as, but not limited to, high power transmit amplifiers (e.g., a final power amplifier), duplexers, filters, low-noise receive amplifiers (e.g., an initial power amplifier), phase shifters, time delay units, transmit/receive switches, and the like. The electronic components of the transmit/receive modules 124 may cause the transmit/receive modules 124 to perform the various functions.

In embodiments, the radiating elements 116 may be spaced away from the transmit/receive module 124 by the first PCB section 108 including the radiating elements 116 and the second PCB section 110 including the transmit/receive modules 124. The radiating elements 116 may be connected to the transmit/receive module 124 through the transmission lines 118 and the rigid-flex connections 112. Thus, the radiating elements 116 may be spaced away from the transmit/receive module 124 and connected through transmission lines 118 and the rigid-flex connections 112.

The first PCB section 108 may include the transmission lines 118. The transmission lines 118 may also be referred to as radio frequency (RF) lines, feed lines, or the like. The transmission lines 118 may connect the radiating elements 116 with the rigid-flex connections 112.

In embodiments, each of the transmission lines 118 may be a same length. Each of the transmission lines 118 may be substantially the same length between the radiating elements 116 and the rigid-flex connections 112. Having the transmission lines 118 be substantially the same length may ensure signals are phase-matched and/or time synchronized. The transmission lines 118 may be time delay adjusted and/or time synchronized by the proper choice of line length differences across the first PCB section 108. Phase-matching and/or time synchronizing the signals may simplify calibration of the doubly conformal AESA 100. It is further contemplated that the second PCB section 110 may include phase-matching circuitry and/or time delay units (not depicted) to compensate for phase-mismatches and/or time delays between signals.

The circuit cards 102 may include the rigid-flex connections 112. The rigid-flex connections 112 may be a rigid-flex printed circuit board (PCB) bend, rigid-flex RF Bendy Joint, a rigid angled connection, and the like. The rigid-flex connections 112 may connect the first PCB section 108 to the second PCB section 110. In embodiments, the rigid-flex connections 112 may connect the transmission lines 118 of the first PCB section 108 to the second PCB section 110. For example, the rigid-flex connections 112 may connect the transmission lines 118 of the first PCB section 108 to transmit/receive modules 124 of the second PCB section 110. For instance, the circuit cards 102 may include the rigid-flex connections 112 connecting each of the transmission lines 118 to a respective of the transmit/receive modules 124. Thus, the radiating elements 116 may be connected to the transmit/receive modules 124 through the transmission lines 118 and the rigid-flex connections 112.

In embodiments, the circuit cards 102 may include rigid outer layers and flexible inner layers. The flexible inner layers may define the rigid-flex connections 112. The rigid outer layers in combination with the flexible inner layers may define the first PCB section 108 and the second PCB section 110. The flexible inner layers of the first PCB section 108 and the second PCB section 110 may be connected to the transmission lines 118 and the transmit/receive modules 124 by way of one or more vias (not depicted), or the like. The rigid-flex connections 112 may be considered rigid in that the first PCB section 108 and the second PCB section 110 are each rigid. The rigid-flex connections 112 may be considered flexible in that the rigid-flex connections 112 are flexible circuit connections. Thus, the rigid-flex connections 112 provide flexible circuit connections between the first PCB section 108 and the second PCB section 110 which are rigid.

The rigid-flex connections 112 may connect the first PCB section 108 with the second PCB section 110 such that the first PCB section 108 may bend relative to the second PCB section 110. For example, the first PCB section 108 may bend relative to the second PCB section 110 about the rigid-flex connections 112. Bending the first PCB section 108 relative to the second PCB section 110 may change a direction to which the radiating elements 116 point.

The substrate 114 may define one or more cut-outs 122. The cut-outs 122 may be disposed through the PCB metallic/dielectric structure. The transmission lines 118 may be disposed around the cut-outs 122. The cut-outs 122 may include a select shape. For example, the cut-outs 122 may be rectangular-shaped cut-outs, although this is not intended as a limitation of the present disclosure. The cut-outs 122 may reduce a weight of the first PCB section 108. Reducing the weight of the first PCB section 108 may reduce a stress on the rigid-flex connections 112 and/or reduce a weight of the doubly conformal AESA 100. In addition to assembly weight reduction, the cut-outs may suppress undesired parasitic surface waves with the aperture to improve AESA scan performance over frequency.

The second PCB section 110 may include the first layer combiner 126. The first layer combiner 126 may be a feed manifold. The first layer combiner 126 may combine signals from the transmit/receive modules 124. The first layer combiner 126 may also split signals going to the transmit/receive modules 124. In this regard, the first layer combiner 126 may be a splitter/combiner. The first layer combiner 126 may connect between the transmit/receive modules 124 and the backplane 104. For example, the first layer combiner 126 may connect between the transmit/receive modules 124 and the array connectors 128. Thus, the first layer combiner 126 of the of the second PCB section 110 of each of the circuit cards 102 may connect between the transmit/receive modules 124 and the array connectors 128.

The doubly conformal AESA 100 may include the backplane 104. The backplane 104 may be a backplane circuit board. The backplane 104 may include one or more components, such as, but not limited to, array connectors 128, second layer combiner 130, and the like.

The backplane 104 may include the array connectors 128. The array connectors 128 may include any suitable connectors, such as, but not limited to, a single-ended connector, a differential connector, a serial peripheral interface (SPI) connector, a digital connector, and the like.

The second PCB section 110 of the circuit cards 102 may be connected to the array connectors 128. The array connectors 128 may provide an interface for mounting and spacing the circuit cards 102 on the backplane 104. The second PCB section 110 of the circuit cards 102 may be connected to the array connectors 128. For example, the first layer combiners 126 of the circuit cards 102 may be connected to the array connectors 128. The array connectors 128 may be considered multi-channel connectors. In this regard, the array connectors 128 may receive signals with multiple channels which have been combined from the radiating elements 116 by the first layer combiner 126. The array connectors 128 may provide a connection between the first layer combiner 126 of the circuit cards 102 and the second layer combiner 130 of the backplane 104.

The backplane 104 may include the second layer combiner 130. The second layer combiner 130 may be connected to the first layer combiner 126 of the second PCB section 110 of each of the plurality of circuit cards 102 through the array connectors 128. The second layer combiner 130 may combine signals received from the circuit cards 102. For example, the second layer combiner 130 may combine signals received from the first layer combiner 126 of the second PCB section 110 of each of the circuit cards 102. The signals may be combined to a single output signal. The second layer combiner 130 may also split signals going to the first layer combiners 126. In this regard, the second layer combiner 130 may be a splitter/combiner.

The first layer combiner 126 and/or the second layer combiner 130 may include one or more passive electronic devices and/or one or more active electronic devices. The first layer combiner 126 and/or the second layer combiner 130 may be any suitable combiner, such as, but not limited to, corporate radio frequency (RF) feed manifolds. For example, the corporate RF feed manifolds may include a Wilkinson combiner, or the like.

The first layer combiner 126 and the second layer combiner 130, may be considered first and second layers, respectively, in that the first layer combiner 126 performs a first layer of combining the signals on the circuit cards 102 and that the second layer combiner 130 performs a second layer of combining the signals from each of the circuit cards 102. The first layer combiner 126 used in combination with the second layer combiner 130 may reduce the number of the array connectors 128 and/or the complexity of the second layer combiner 130. The number of array connectors 128 may scale only with the number of the circuit cards 102, and is not required to scale based on the number of the radiating elements 116. For example, the number of the array connectors 128 may be "N" where N is the number of the circuit cards 102. Thus, the doubly conformal AESA 100 may include a matching number of the circuit cards 102 and the array connectors 128. In contrast, combining all the signals from the radiating elements 116 on the backplane 104 may require the number of the array connectors 128 to be by "M" by "N", where M is the number of the radiating elements 116 per each of the circuit cards 102 and N is the number of the circuit cards 102. Similarly, where the second layer combiner 130 is a corporate RF feed combiner, the number of feeds may be "N" where N is the number of the circuit cards 102.

The doubly conformal AESA 100 may include an even number M of the radiating elements 116 per circuit card 102 and an even number N of the circuit cards 102 to enable the corporate splitting/combining for the first layer combiner 126 and the second layer combiner 130, respectively. For example, the doubly conformal AESA 100 may include a power of 2 of the radiating elements 116 per circuit card 102 and may include a power of 2 of the circuit cards 102. Providing the power of 2 of the radiating elements 116 per circuit card 102 may cause the first layer combiner 126 to include a same number of junctions in which to split/combine the radiating elements 116 via the corporate feeds.

Similarly, providing the power of 2 of the circuit cards 102 may cause the second layer combiner 130 to include a same number of junctions in which to split/combine the circuit cards 102.

The doubly conformal AESA 100 may include the chassis 106. The chassis 106 may also be referred to as a mounting chassis. The chassis 106 may be a receptacle assembly for the circuit cards 102 and the backplane 104. The chassis 106 may include one or more components, such as, but not limited to, an upper card cage 132, a flange 134, a lower card cage 136, alignment rails 138, and the like.

The chassis 106 may include the upper card cage 132. The upper card cage 132 may include a selected shape. For example, the upper card cage 132 may include a hemicylindrical shape, a hemispherical shape, or the like. The shape of the upper card cage 132 may be selected to reduce an aerodynamic drag of the doubly conformal AESA 100. The upper card cage 132 may include a flat portion which is hollow. In this regard, the upper card cage 132 may include a hemicylindrical bowl shape, a hemispherical bowl shape, or the like. The hollow portion of the upper card cage 132 may be oriented towards the flange 134 and the lower card cage 136. The circuit cards 102 may be disposed in the hollow portion. A curved surface of the upper card cage 132 may be an upper surface of the upper card cage 132. The curved surface may define the hemicylindrical shape and/or the hemispherical shape.

The chassis 106 may include the alignment rails 138. The alignment rails 138 may not be aligned in parallel. For example, each of the alignment rails 138 may be set at a separate angle. The alignment rails 138 may be aligned in non-parallel planes by each of the alignment rails 138 being set at the separate angle. A center alignment rail of the alignment rails 138 may be a substantially vertical angle and may be disposed at a center of the upper card cage 132. The remainder of the alignment rails 138 may include an angle which decreases away from the vertical angle away as the alignment rails 138 move from the center of the upper card cage 132. Thus, the alignment rails 138 may fan out from the center of the upper card cage 132.

The upper card cage 132 may define alignment rails 138. The alignment rails 138 may be tracks in the upper surface of the upper card cage 132. Thus, the chassis 106 may include the alignment rails 138 by defining the alignment rails 138 in the upper surface of the upper card cage 132. The tracks may also be referred to as slits. The alignment rails 138 may be tracks defined through the upper card cage 132. The circuit cards 102 may be disposed in the alignment rails 138 such that the first PCB sections 108 may protrude through the upper card cage 132. The radiating elements 116 may then be disposed outside of the upper card cage 132. Protruding the first PCB sections 108 may provide a thermal benefit. For example, heat from the radiating elements 116 may transfer to the environment.

The chassis 106 may include the flange 134. The flange 134 may project outward from the upper card cage 132 and/or the lower card cage 136. The flange 134 may provide a surface by which the doubly conformal AESA 100 may be mounted to a platform. The flange 134 may be disposed between the upper card cage 132 and the lower card cage 136.

The chassis 106 may include the lower card cage 136. The lower card cage 136 may be a four-sided assembly. For example, the lower card cage 136 may include a hollow cuboid shape, or the like.

The upper card cage 132, the flange 134, and the lower card cage 136 may be joined. For example, the upper card cage 132, the flange 134, and the lower card cage 136 may be joined by one or more fasteners (e.g., snaps, screws, threaded connections, etc.), adhesives, interference fits, and the like. It is contemplated that there are several mechanical options by which the components of the chassis 106 may be joined. Flange 134 can either be singly curved or doubly curved to seamlessly blend with an air vehicle's mold line.

The circuit cards 102 may be disposed within the chassis 106. The second PCB section 110 and/or the backplane 104 may be disposed within the lower card cage 136 below the flange 134. The second PCB section 110 and/or the backplane 104 may be disposed within the lower card cage 136 below the flange 134 to reduce a height of the upper card cage 132 above the flange 134 (e.g., to minimize aperture protrusion). The first PCB section 108 and the radiating elements 116 may extend above the flange 134. The first PCB section 108 may be disposed in the upper card cage 132.

The chassis 106 may include one or more of the alignment rails 138 for each of the circuit cards 102. The first PCB sections 108 may be disposed in the alignment rails 138. The alignment rails 138 may support the first PCB sections 108. The first PCB sections 108 are not aligned in parallel when supported by the alignment rails 138. The alignment rails 138 may orient the first PCB sections 108 by bending the first PCB sections 108 about the rigid-flex connections 112. The alignment rails 138 may orient the first PCB sections 108 to realize a second curve of the doubly curved aperture. The curved edge 120 on which the radiating elements 116 are disposed may define the first curve and the orientation of the first PCB sections 108 by the alignment rails 138 may define the second curve of the doubly conformal AESA 100, creating a double curved radiation aperture. For example, the radiating elements 116 across the circuit cards 102 may define a hemispherical array. The alignment rails 138 may fan out the first PCB section 108 of the circuit cards 102 based on the angle of the alignment rails 138.

In embodiments, the alignment rails 138 maintain the radiating elements 116 with the lattice spacing between adjacent of the circuit cards 102. The alignment rails 138 may maintain the radiating elements 116 with the lattice spacing based on the spacing between adjacent of the alignment rails 138 and the angles of the alignment rails 138. The spacing between each of the radiating elements 116 which are adjacent may be identical across rows and columns of the doubly conformal AESA 100. Thus, the lattice spacing may be maintained across the doubly conformal AESA 100 by the alignment rails 138 maintaining the radiating elements 116 with the lattice spacing between adjacent of the circuit cards 102 and by the radiating elements 116 being arranged in the linear array on the curved edge with the lattice spacing. It is further contemplated that the spacing between the radiating elements 116 on a single of the circuit cards 102 and/or between multiple of the circuit cards 102 may not be the same.

In embodiments, the second PCB section 110 of the circuit cards 102 may be aligned in parallel when connected to the array connectors 128. For example, the second PCB section 110 may connect to the array connectors 128 such that the second PCB section 110 are orthogonal to the backplane 104. The angle between the second PCB sections 110 may be within a tolerance of 0-degrees, for example, 1-degrees, such that the second PCB sections 110 may be considered aligned in parallel. Aligning the second PCB section 110 of the circuit cards 102 in parallel may be improve ease-of-assembly of the doubly conformal AESA 100. Additionally, each of the array connectors 128 may be a common type, not requiring unique of the array connectors 128 for each of the second PCB sections 110. The second PCB sections 110 may be aligned in parallel when connected to the array connectors 128 while creating the double curved radiation aperture.

In embodiments, the rigid-flex connections 112 may be defined in a straight line between the first PCB section 108 and the second PCB section 110. The rigid-flex connections 112 may include a uniform bend angle between the first PCB section 108 and the second PCB section 110 when defined in a straight line between the first PCB section 108 and the second PCB section 110. The radiating elements 116 may then include the uniform bend angle. For example, the rigid-flex connections 112 may be defined in a straight line between the first PCB section 108 and the second PCB section 110 along a bottom of the first PCB section 108 and along a top of the second PCB section 110.

Referring now to FIG. 2A-2M, an example of the doubly conformal AESA 100 is described, in accordance with one or more embodiments of the present disclosure. In this example, the doubly conformal AESA 100 includes seven of the circuit cards 102. The first PCB sections 108 of the circuit cards 102 each include seven of the radiating elements 116 where the radiating elements are differential, fourteen of the radiating elements (i.e., M=14) where the radiating elements are single ended. The backplane 104 includes seven of the array connectors (i.e., N=seven) and the card cage 132 includes seven of the alignment rails 138, one for each of the respective of the circuit cards 102. As may be understood, the doubly conformal AESA 100 may scale to any M×N array, such that the examples provided is not intended to be limiting. Furthermore, as previously described, the numbers M of the radiating elements 116 per circuit card 102 and the numbers N of the circuit cards 102 may each be even numbers and/or may be a power of 2.

In the interest of clarity, the specific circuits of the transmit/receive module 124 and the first layer combiner 126 are not depicted on the second PCB section 110 and the specific circuits of the second layer combiner 130 are not depicted on the backplane 104 in this example.

Figure 3:
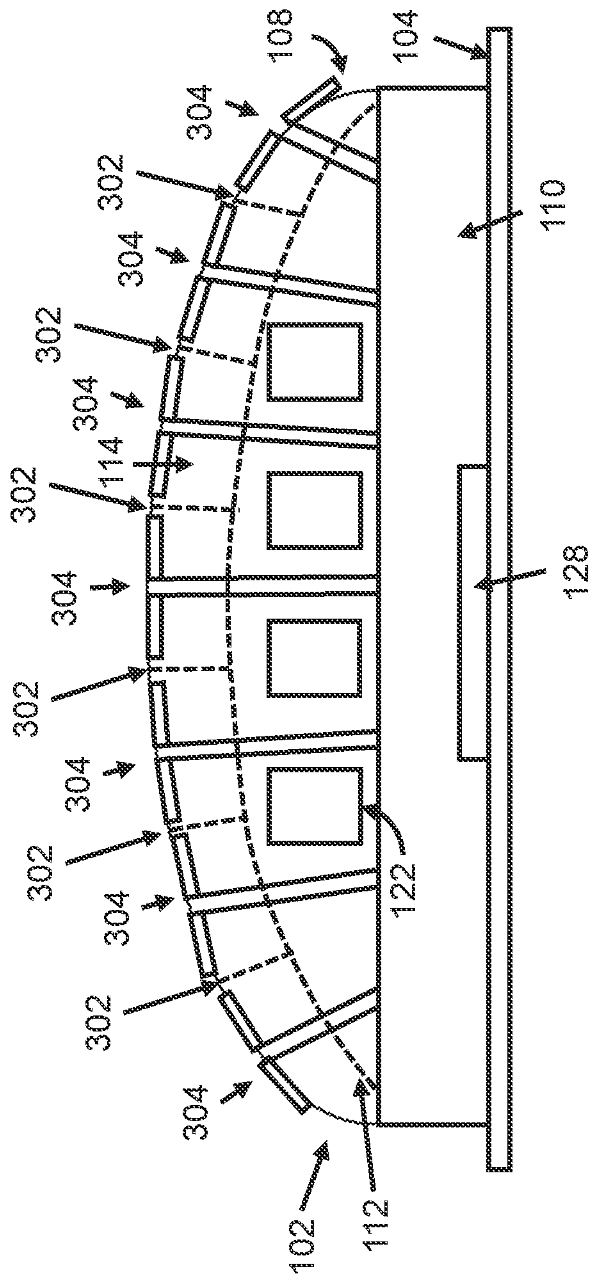
FIG. 3 depicts a side view of an exemplary doubly conformal AESA with a chassis and several circuit cards which are hidden, in accordance with one or more embodiments of the present disclosure.
Figure 4A:
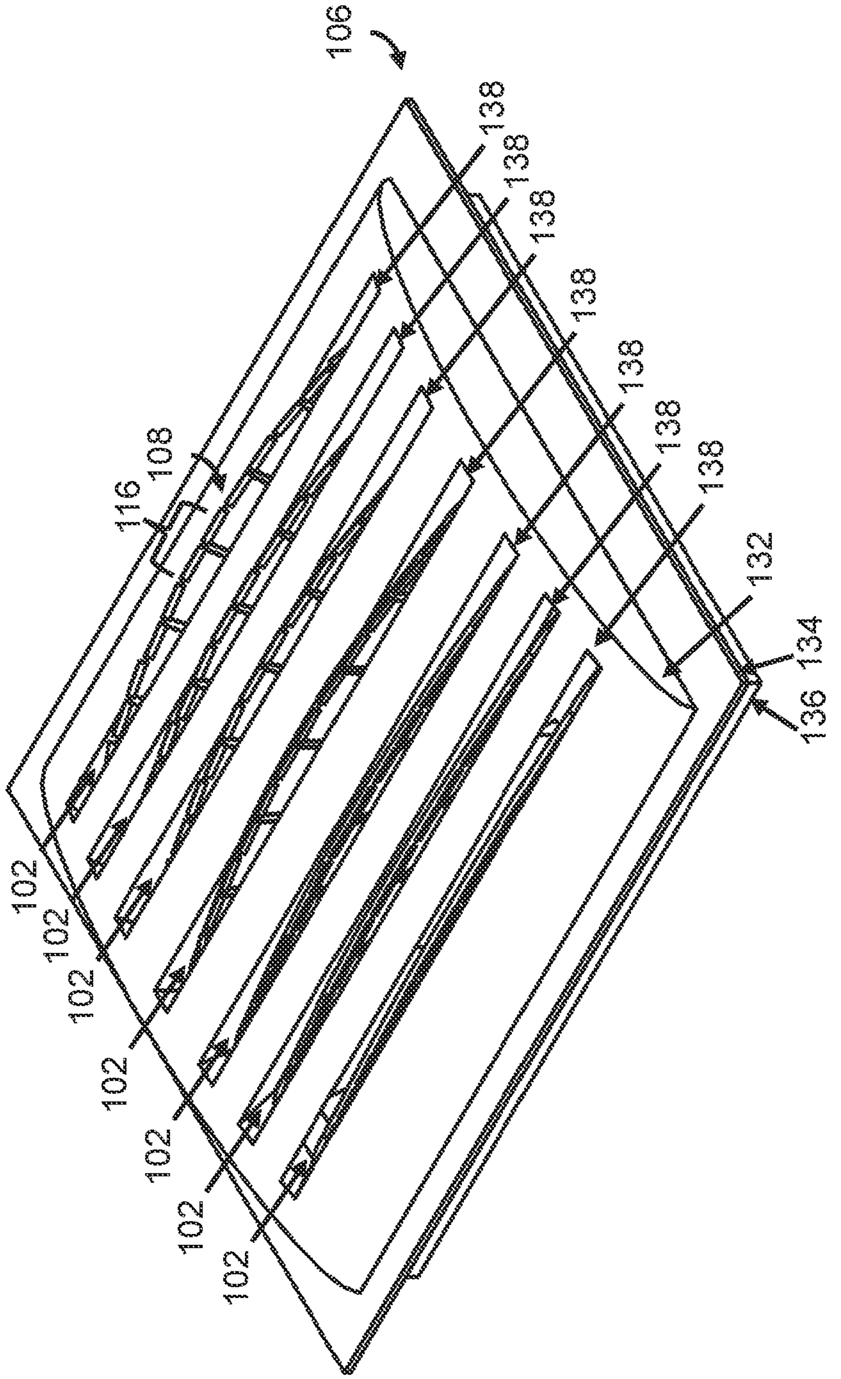
FIG. 4A depicts a perspective view of an exemplary doubly conformal AESA, in accordance with one or more embodiments of the present disclosure.
Figure 4B:
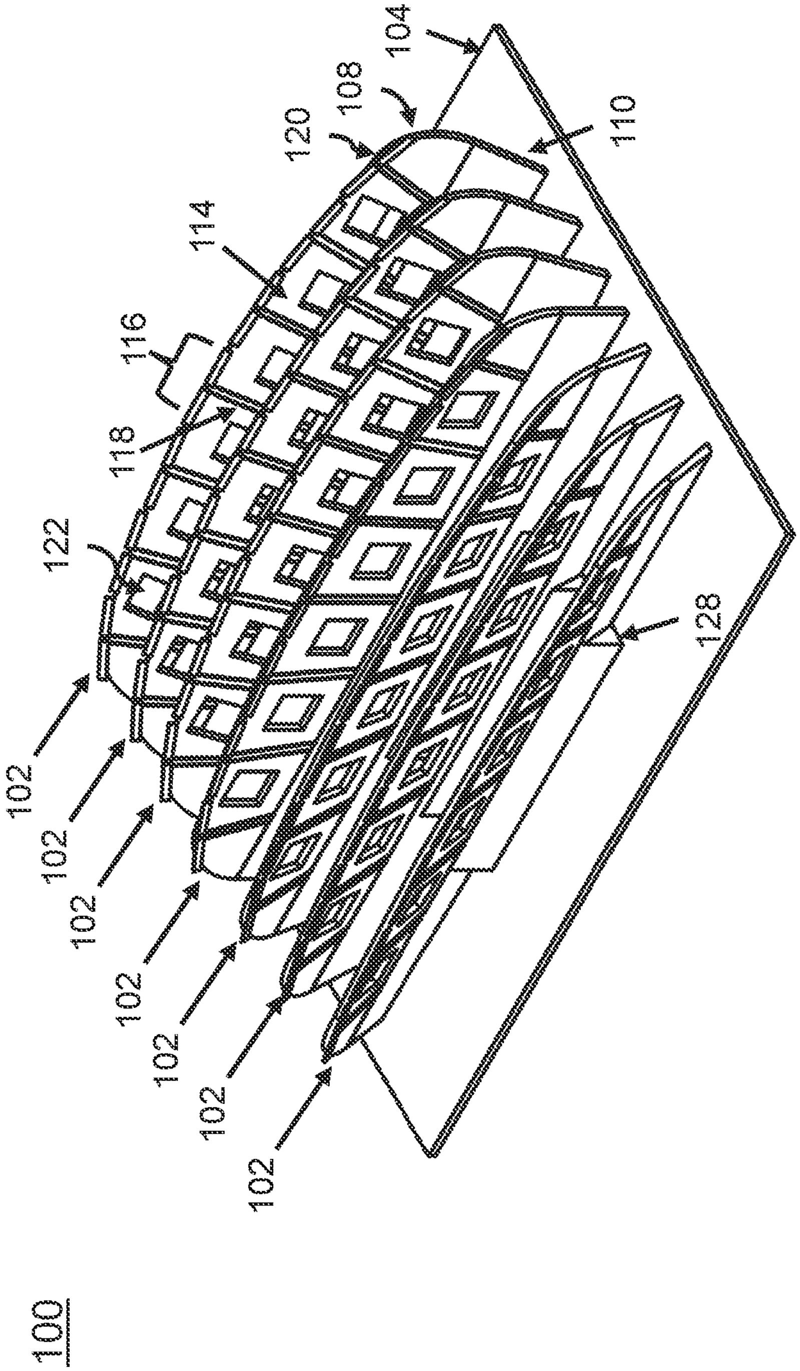
FIG. 4B depicts a perspective view of an exemplary doubly conformal AESA with a chassis which is hidden, in accordance with one or more embodiments of the present disclosure.
Figure 4C:
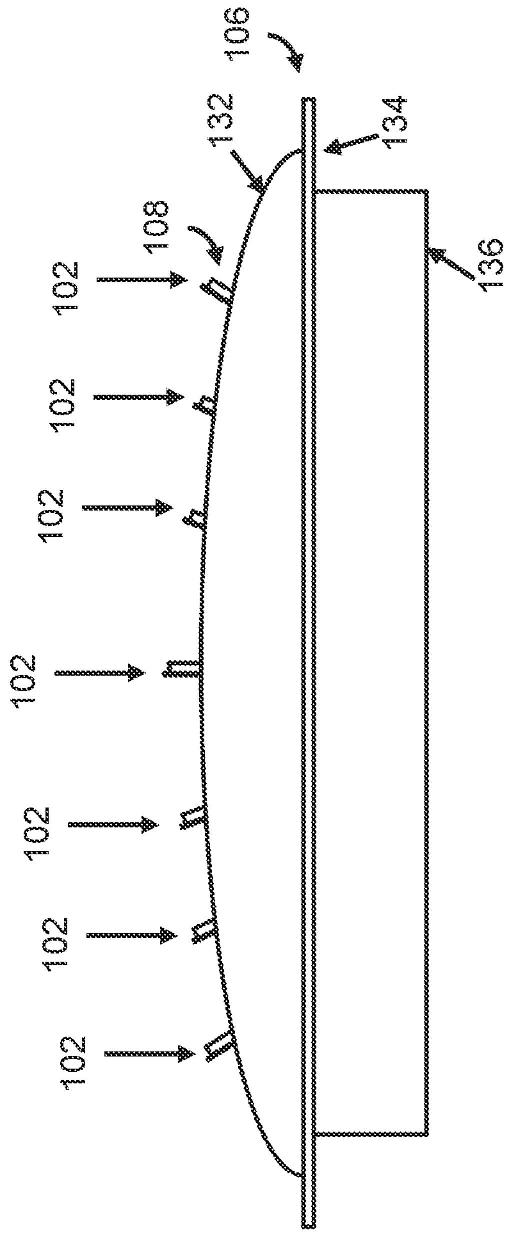
FIG. 4C depicts a front view of an exemplary doubly conformal AESA, in accordance with one or more embodiments of the present disclosure.
Figure 4D:
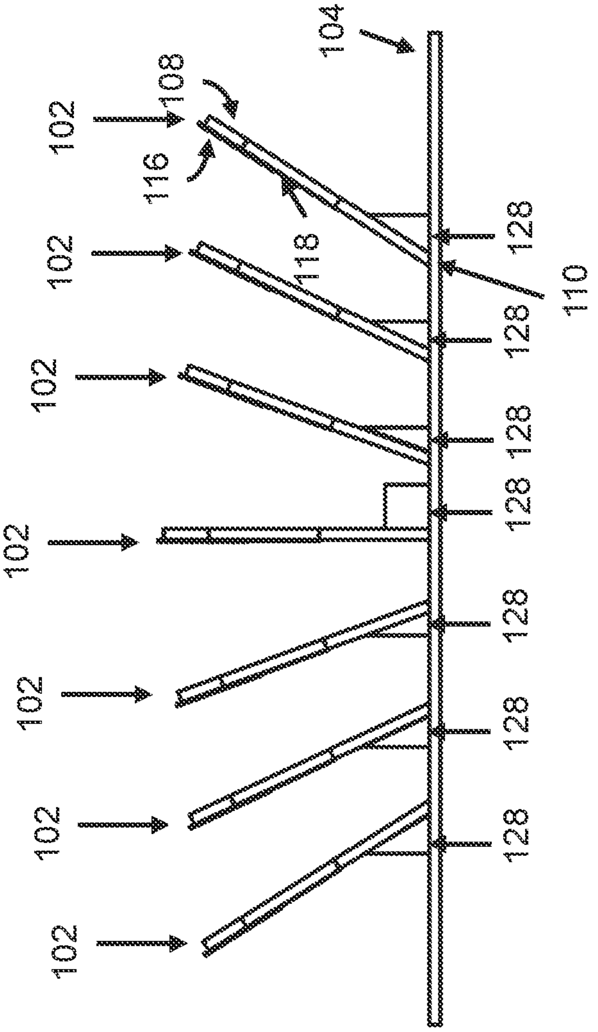
FIG. 4D depicts a front view of an exemplary doubly conformal AESA with a chassis which is hidden, in accordance with one or more embodiments of the present disclosure.

Referring now to FIG. 3, the doubly conformal AESA 100 is described, in accordance with one or more embodiments of the present disclosure. Although the rigid-flex connections 112 have been described as defined in a straight line between the first PCB section 108 and the second PCB section 110, this is not intended as a limitation of the present disclosure. In embodiments, rigid-flex connections 112 may be defined in a curved line between the first PCB section 108 and the second PCB section 110.

The substrate 114 may also define cut lines 302. The cut lines 302 may be defined between each of the radiating elements 116. The cut lines 302 may be defined to create tabs 304 of the substrate 114. The substrate 114 may include the tabs 304. The tabs 304 may be configured to independently bend about the rigid-flex connections 112. The tabs 304 of the substrate 114 may define the curved edge 120 on which the radiating elements 116 are disposed. Thus, the radiating elements 116 may be disposed on the tabs 304. For example, each of the radiating elements 116 may be disposed on respective of the tabs 304. Each of the radiating elements 116 may include a separate bend angle by being disposed on respective tabs of the first PCB section 108. It is further contemplated that more than one of the radiating elements 116 may be disposed on a tab.

Referring now to FIGS. 4A-4D, the doubly conformal AESA 100 is described, in accordance with one or more embodiments of the present disclosure. Although the circuit cards 102 are described as including the rigid-flex connections 112 and the second PCB section 110 of the circuit cards 102 have been described as aligned in parallel with each other when connected the array connectors 128, this is not intended as a limitation of the present disclosure.

In embodiments, the first PCB section 108 may be fixed to and co-planar with the second PCB section 110. The first PCB section 108 may be fixed to the second PCB section 110 such that the first PCB section 108 may not bend relative to the second PCB section 110. The first PCB section 108 and the second PCB section 110 may be co-planar along the plane of the substrate 114. For example, the substrate 114 may extend between the first PCB section 108 and the second PCB section 110. The radiating elements 116 may be connected to the transmit/receive module 124 through the transmission lines 118.

In embodiments, the second PCB section 110 of the circuit cards 102 may not aligned in parallel when connected to the array connectors 128. At least some of the array connectors 128 may be angled array connectors. For example, a center array connector of the array connectors 128 may be a non-angled array connector and the remainder of the array connectors 128 may be angled array connectors. The center array connector may connect to a center circuit card of the circuit cards 102 and maintain the center circuit card orthogonal to the backplane 104. The angled array connectors may connected to the remainder of the circuit cards 102 and maintain the remainder of the circuit cards at acute angles relative to the backplane 104. The angled array connectors may be a wedged shaped structure, or the like. The circuit cards 102, including both the first PCB section 108 and the second PCB section 110, may be set at an angle relative to the backplane 104 based on the angle of the angled array connectors. The angle of the first PCB section 108 may cause the radiating elements 116 to point at the angle, thereby defining the second curve of the doubly conformal AESA 100. Each of the circuit cards 102 may require a select angle of the angled array connectors to achieve the lattice spacing. The angled array connectors may be custom angled array connectors to achieve the desired angles.

The angled array connectors may or may not include left/right symmetry relative to a center of the doubly conformal AESA 100. For example, the angled array connectors may be symmetric about the center array connector. The left/right symmetry may halve the number of custom angled array connectors required to be designed.

The angled array connectors may enable creating the double curved radiation aperture without the rigid-flex connections 112 between the first PCB section 108 and the second PCB section 110. For example, the angled array connectors may eliminate the need for the rigid-flex connections 112 if the radius of curvature is gentle enough to avoid mechanical interference between the circuit cards 102. It is contemplated that the angled array connectors may also enable the chassis 106 to have a reduced height. However, the benefits provided by the angled array connectors may be at the expense of requiring custom angles for each of the angled array connectors.

Figure 5A:
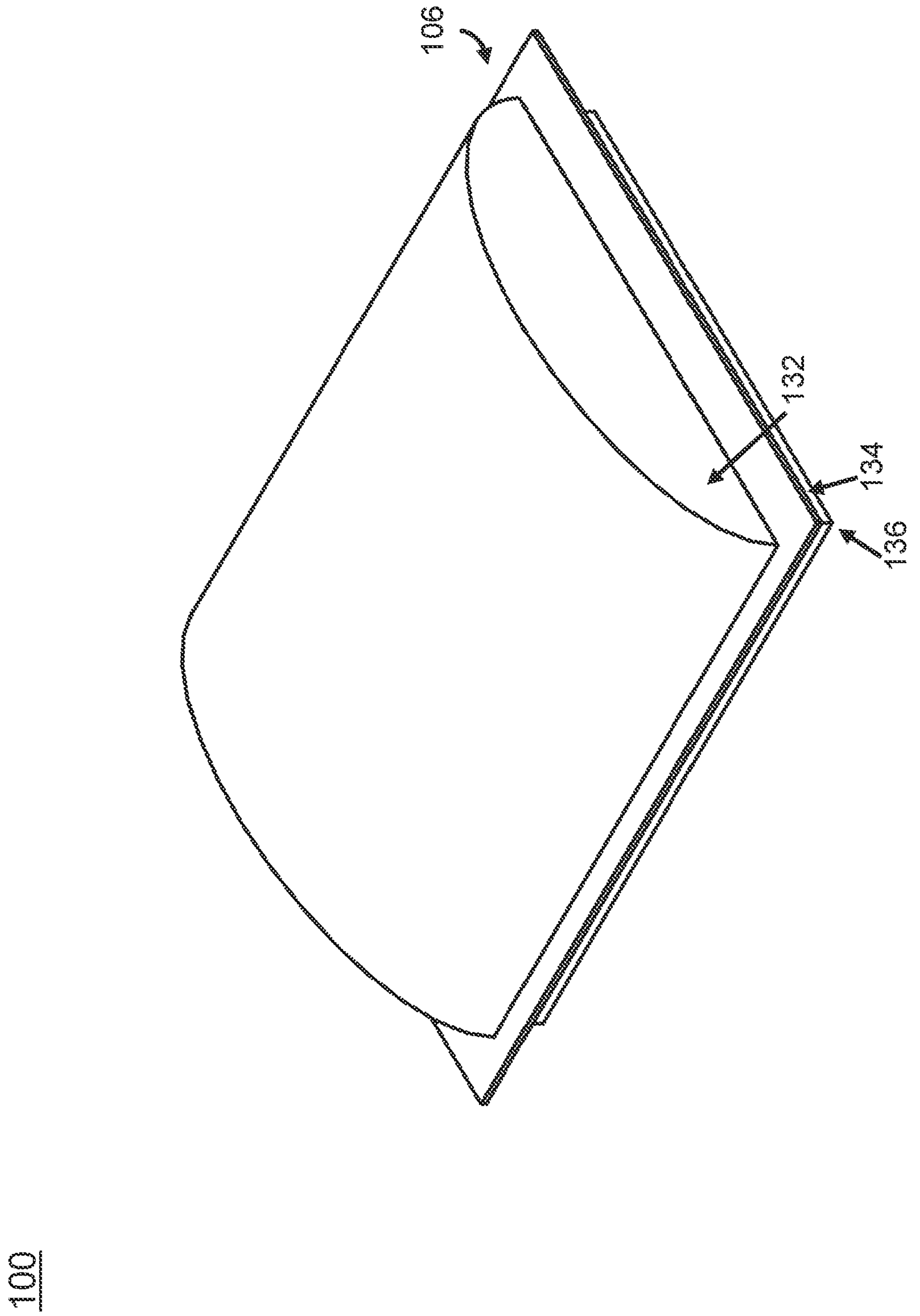
FIG. 5A depicts a perspective view of an exemplary doubly conformal AESA, in accordance with one or more embodiments of the present disclosure.
Figure 5B:
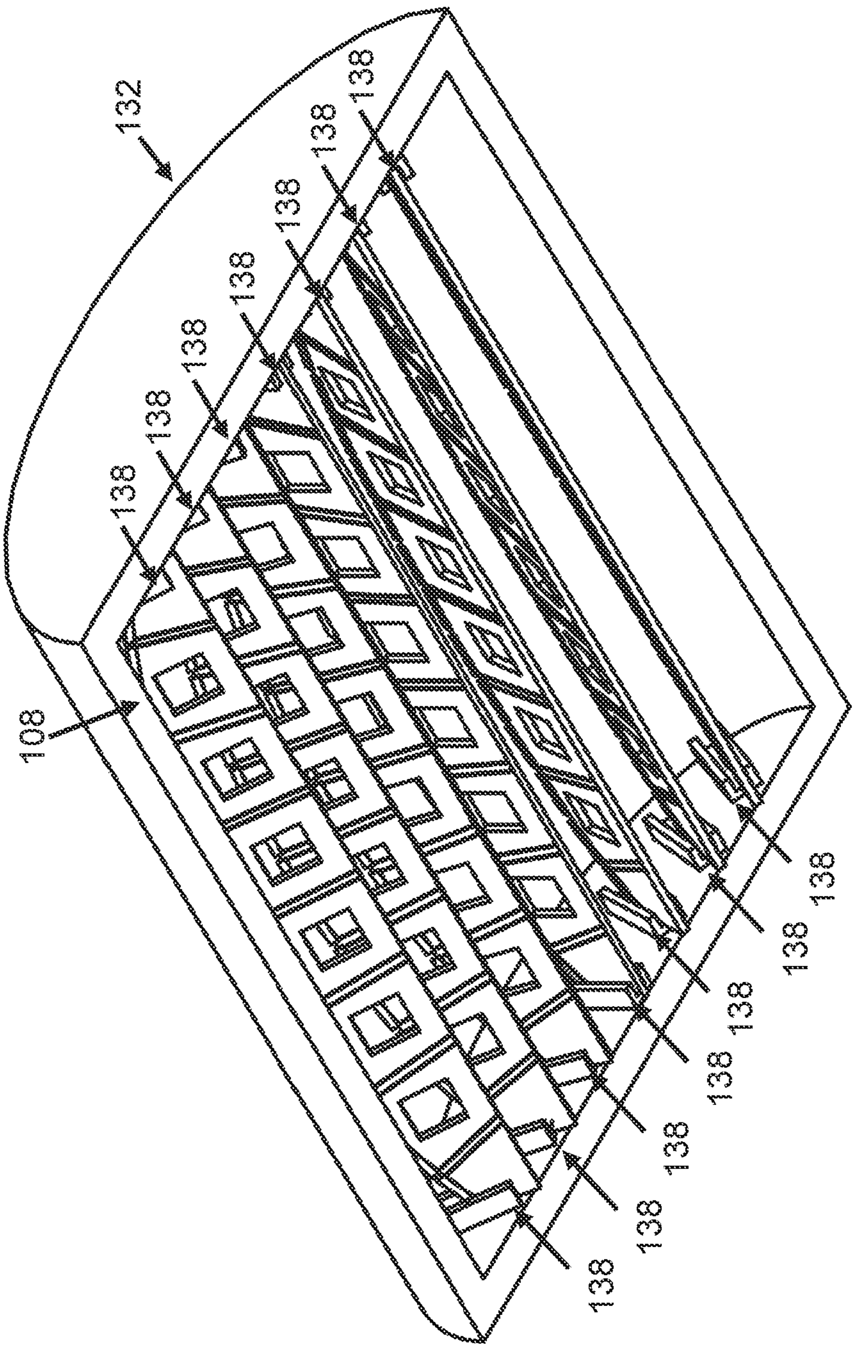
FIG. 5B bottom perspective view of an exemplary doubly conformal AESA showing a printed circuit board section disposed in alignment rails, in accordance with one or more embodiments of the present disclosure.

Referring now to FIGS. 5A-5B, the doubly conformal AESA 100 is described, in accordance with one or more embodiments of the present disclosure. Although the alignment rails 138 are described as being defined through the upper card cage 132 and the first PCB section 108 is described as projecting through the upper card cage 132, this is not intended as a limitation of the present disclosure. The alignment rails 138 may not be defined through the upper card cage 132. Rather, the alignment rails 138 may be disposed in the bowl portion of the upper card cage 132. The alignment rails 138 may be implemented many ways mechanically such as but not limited to, by being defined by the upper card cage 132 or as a separate component coupled to the chassis 106 or backplane 104. For example, the alignment rails 138 may be defined by the upper surface of the upper card cage 132. By way of another example, the alignment rails 138 may be a separate component from the upper card cage 132. For instance, the alignment rails 138 may be U-channel pairs which may be coupled to the upper card cage 132, the flange 134, the lower card cage 136, the backplane 104, or the like. However, it is contemplated that defining the alignment rails 138 in the upper card cage 132 or coupling the alignment rials 138 to the upper card cage 132 may provide for ease-of-assembly of the doubly conformal AESA 100.

The upper card cage 132 may be a thin-walled radome, frequency selective surface (FSS) radome, a Wide-Angle Impedance Matching (WAIM) radome with an integrated polarizer, or the like. The upper card cage 132 may be made of a radome material which is designed to transmit and receive frequencies of electromagnetic radiation for which the radiating elements 116 are configured to transmit and receive. The FSS radome material may be designed to block frequencies of electromagnetic radiation outside of the frequencies for which the radiating elements 116 are configured to transmit and receive. The WAIM radome may improve AESA scan volume over frequency. The polarizer can be used to create circularly polarized radiation from the radiating elements 116 which are linearly polarized. The polarizer may include but is not limited to a meander line polarizer defined by the upper card cage 132. The FSS radome can be used to create a bandpass radome to lower out-of-band AESA Radar Cross Section (RCS). In additional the polarizer can be integrated with the FSS Radome. The polarizer and/or FSS radome can be realized through a multilayer additive manufacturing process. Alternatively, the polarizer and/or FSS radome can be realized as single later or multilayer sequential lamination appliques of flexible PCB materials. Environmental protection off the upper card cage 132 can also be enabled with radio frequency (RF) benign conformal coatings.

Referring generally again to the figures.

The doubly conformal AESA 100 may be used with a wide range of operational frequencies. For example, the doubly conformal AESA 100 may operate in the SHF-band (e.g., 3 to 30 GHz). The doubly conformal AESA 100 may be configured for frequencies in the C-band (e.g., 4 to 8 GHz), the X-Band (e.g., 8 to 12 GHz), Ku-band (e.g., 12 to 18 GHz), K-band (e.g., 18 to 27 GHz), Ka-band (e.g., 27 to 40 GHz), and/or V-band (e.g., 40 to 75 GHz). The doubly conformal AESA 100 may be suited for the X-Band and/or the Ku-band to keep an overall height of the doubly conformal AESA 100 to a minimum. The doubly conformal AESA 100 may enable a Ku-band data link. For example, the doubly conformal AESA 100 may provide an environmentally robust Ku/Ka Band Data Link, radar and SatCom doubly conformal Active Electronically Scanned Array (AESA) with wide Field of View (FoV). In embodiments, the highest frequencies at which the doubly conformal AESA 100 is configured to operate may control the lattice spacing.

It is contemplated that the doubly conformal AESA 100 may be used in a variety of applications, such as, but not limited to, sensors, communication, radar, electronic warfare, and the like.

The chassis 106 may be integrated with one or more vehicular platforms. The vehicular platforms may include, but is not limited to, Future Tactical Unmanned Aircraft System (FTUAS), air-launched effects (ALE), Future Attack Reconnaissance Aircraft (FARA), communication combat aircraft, attritable assets, lower-tier unmanned aerial systems (UAS), small weapons platforms, and the like. The doubly conformal AESA 100 may enable wide AESA beam scanning FoV and more degrees of freedom in AESA-to-platform mounting for real estate challenged platforms.

The lower card cage 136 may be disposed in a cavity of the vehicular platform. The lower card cage 136 may fit into the cavity to minimize aerodynamic drag. The lower card cage 136 may be disposed in the cavity up to the flange 134. The flange 134 may mount to a surface of the vehicular platform and support the doubly conformal AESA 100. The volume of the doubly conformal AESA 100 disposed outside of the cavity may include the first PCB section 108, the flange 134, and the upper card cage 132.

The doubly conformal AESA 100 may include thermal management. The thermal management may be disposed in the lower card cage 136. For example, the thermal management may be disposed between the second PCB sections 110 of the circuit cards 102. The thermal management may include, but is not limited to, fins, fans, heat pipes, and the like.

The antenna elements may be made of a conductive metal or alloy. For example, the antenna elements may be made of stainless steel, copper, brass, or any other conductive metal or alloy.

The radiating elements 116 may include any suitable antenna element. In embodiments, the radiating elements 116 may include linear polarized "end fire" radiating elements. The linear polarized "end fire" radiating elements may include dipoles, droopy dipoles, tightly coupled dipole arrays (TCDA), 1D TEM horns, Vivaldi's, Balance Antipodal Vivaldi Antenna (BAVA), printed Yagi-Uda elements, and the like. In embodiments, the radiating elements 116 may include "half section" radiating elements. The "half section" radiating elements may use all metal and/or no dielectric radiation element. The "half section" radiating elements may be additively manufactured in "half sections" to sandwich the first PCB sections 108 between each radiating element. The feeds for these "half section" radiating elements may be integral to the first PCB sections 108. The radiating element "halves" may be connected. The connection may include solder, elastomeric interconnects under compression, a bolt and nut clamp assembly, conductive epoxy, or some combination thereof. The radiating elements 116 can be manufactured as "filleted ½ sections" linear arrays where several radiating elements can be attached simultaneously. Examples of the "filleted ½ sections" linear arrays include Vivaldi, 45 "twist" Vivaldi, phase center coincident dual linearly polarized Vivaldi variants, Single and Dual Ridged open-ended waveguides, Single and Dual Ridged horns, and the like. The bandwidth of the "filleted ½ sections" linear arrays may be constrained by the required array lattice density required a specific grating lobe. A triangular array lattice may ease in card insertion/assembly due to relaxed array lattice spacing in one dimension for grating lobe-free operation.

The radiating elements 116 may include a polarization, such as but not limited to a linearly polarization and/or a dual polarization. For example, the radiating elements 116 may be linearly polarized elements which are horizontally and/or vertically polarized. The circuit cards 102 may include a polarization such as, but not limited to, horizontal polarization, vertical polarization, dual linear polarization, circular polarization or the like. The circuit cards 102 may be crisscrossed (not depicted) to enable dual linear polarization. For example, a first pair of circuit cards 102 may be horizontally polarized and a second pair of circuit cards 102 may be vertical polarized. The first pair of circuit cards 102 may be orthogonal to the second pair of circuit cards 102.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A doubly conformal active electronically scanned array comprising:

a plurality of circuit cards each comprising:

a first printed circuit board section comprising:

a substrate; wherein the substrate defines a curved edge;

a plurality of radiating elements; wherein the plurality of radiating elements are arranged in a linear array on the curved edge such that the linear array is one-dimensionally conformal; and a plurality of transmission lines;

a second printed circuit board section comprising:

a plurality of transmit/receive modules; and a first layer combiner; and one or more rigid-flex connections; wherein the one or more rigid-flex connections connect the first printed circuit board section with the second printed circuit board section such that the first printed circuit board section is configured to bend relative to the second printed circuit board section about the one or more rigid-flex connections; wherein the plurality of radiating elements are connected to the plurality of transmit/receive modules through the plurality of transmission lines and the one or more rigid-flex connections;

a backplane comprising:

a plurality of array connectors; wherein the second printed circuit board section of the plurality of circuit cards are connected to the plurality of array connectors; and a second layer combiner; and a chassis comprising an upper card cage and a plurality of alignment rails; wherein the plurality of alignment rails are not aligned in parallel; wherein the first printed circuit board section of the plurality of circuit cards are disposed in the plurality of alignment rails.

2. The doubly conformal active electronically scanned array of claim 1, wherein the curved edge is a convex curved edge.

3. The doubly conformal active electronically scanned array of claim 1, wherein the substrate defines a plurality of cut-outs; wherein the plurality of transmission lines are disposed around the plurality of cut-outs.

4. The doubly conformal active electronically scanned array of claim 1, wherein the first layer combiner is connected between the plurality of transmit/receive modules and the plurality of array connectors; wherein the first layer combiner is configured to combine signals from the plurality of transmit/receive modules.

5. The doubly conformal active electronically scanned array of claim 4, wherein the second layer combiner is connected to the first layer combiner of the second printed circuit board section of each of the plurality of circuit cards through the plurality of array connectors; wherein the second layer combiner is configured to combine signals from the first layer combiner of the second printed circuit board section of each of the plurality of circuit cards.

6. The doubly conformal active electronically scanned array of claim 1, wherein at least one of the first layer combiner and the second layer combiner comprise corporate radio frequency feed manifolds.

7. The doubly conformal active electronically scanned array of claim 1, comprising a matching number of the plurality of circuit cards and the plurality of array connectors.

8. The doubly conformal active electronically scanned array of claim 1, wherein the upper card cage is one of a radome, a frequency selective surface radome, or a wide-angle impedance matching radome with an integrated polarizer.

9. The doubly conformal active electronically scanned array of claim 1, wherein the chassis comprises a flange and a lower card cage; wherein the flange extends outwards from the upper card cage and the lower card cage; wherein the flange is disposed between the upper card cage and the lower card cage; wherein the second printed circuit board section and the backplane are disposed in the lower card cage.

10. The doubly conformal active electronically scanned array of claim 1, wherein the second printed circuit board section of the plurality of circuit cards are aligned in parallel; wherein the second printed circuit board section of the plurality of circuit cards are orthogonal to the backplane.

11. The doubly conformal active electronically scanned array of claim 1, wherein the plurality of radiating elements are arranged in the linear array on the curved edge with a lattice spacing; wherein the plurality of alignment rails maintain the plurality of radiating elements with the lattice spacing between adjacent of the plurality of circuit cards.

12. The doubly conformal active electronically scanned array of claim 11, wherein the doubly conformal active electronically scanned array is configured for frequencies in at least one of a C-band, an X-band, a Ku-band, a K-band, a Ka-band, or a V-band.

13. The doubly conformal active electronically scanned array of claim 1, wherein the one or more rigid-flex connections are defined in a straight line between the first printed circuit board section and the second printed circuit board section.

14. The doubly conformal active electronically scanned array of claim 1, wherein the one or more rigid-flex connections are defined in a curved line between the first printed circuit board section and the second printed circuit board section; wherein the substrate comprises a plurality of tabs; wherein the plurality of tabs are configured to independently bend about the one or more rigid-flex connections; wherein the plurality of tabs define the curved edge on which the plurality of radiating elements are disposed.

15. The doubly conformal active electronically scanned array of claim 1, wherein the plurality of alignment rails fan out from a center of the upper card cage.

* * * * *